(12) United States Patent
Khambekar et al.

(10) Patent No.: US 10,368,246 B2
(45) Date of Patent: Jul. 30, 2019

(54) METHODS AND SYSTEMS FOR SPECTRUM MANAGEMENT

(71) Applicant: The Research Foundation for The State University of New York, Amherst, NY (US)

(72) Inventors: Nilesh Khambekar, Sunnyvale, CA (US); Vipin Chaudhary, Williamsville, NY (US); Chad Spooner, Monterey, CA (US)

(73) Assignee: The Research Foundation for The State University of New York, Amherst, NY (US)

( * ) Notice: Subject to any disclaimer, the term of this patent is extended or adjusted under 35 U.S.C. 154(b) by 0 days.

(21) Appl. No.: 15/335,429

(22) Filed: Oct. 26, 2016

(65) Prior Publication Data
US 2017/0208476 A1 Jul. 20, 2017

Related U.S. Application Data

(60) Provisional application No. 62/327,078, filed on Apr. 25, 2016, provisional application No. 62/246,589, filed on Oct. 26, 2015.

(51) Int. Cl.
*H04W 16/14* (2009.01)
*H04B 17/318* (2015.01)
(Continued)

(52) U.S. Cl.
CPC .......... *H04W 16/14* (2013.01); *H04B 17/318* (2015.01); *H04B 17/345* (2015.01);
(Continued)

(58) Field of Classification Search
CPC .... H04W 14/14; H04B 17/318; H04B 17/345
See application file for complete search history.

(56) References Cited

U.S. PATENT DOCUMENTS 7,483,711 B2    1/2009   Burchfiel
7,599,686 B2   10/2009   Quinn et al.
(Continued)

FOREIGN PATENT DOCUMENTS

WO         0223758       3/2002

OTHER PUBLICATIONS

Khambekar, et al., Quantified Spectrum Sharing: Motivation, Approach, and Benefits, avalailable online at https://arxiv.org/pdf/1608.07854v1.pdf , Aug. 28, 2016.
(Continued)

*Primary Examiner* — Bo Hui A Zhu
(74) *Attorney, Agent, or Firm* — Hodgson Russ LLP

(57) ABSTRACT

In the static and exclusive spectrum allocation paradigm, the spectrum-access parameters for a service are chosen to mitigate potential harmful-interference and ensure minimum performance under worst-case conditions. The new dynamic spectrum-sharing paradigm necessitates dynamically defining and enforcing the spectrum-access rights while accommodating the dynamics of the RF environment and the spectrum-access scenarios. To enforce spectrum-access rights, emphasis is placed on capturing the use of spectrum by an individual transceiver. Spectrum-access rights are articulated in terms of the characterization of the spectrum used by an individual transceiver in the space, time, and frequency dimensions. In order to estimate the use of spectrum in real time, an RF-sensor network is employed, the network uses interference-tolerant algorithms to estimate the transceiver spectrum-access parameters and to characterize the propagation environment.

8 Claims, 24 Drawing Sheets

(51) Int. Cl.
  *H04B 17/345* (2015.01)
  *H04W 4/021* (2018.01)
  *H04W 64/00* (2009.01)
  *H04W 52/22* (2009.01)
  *H04W 52/24* (2009.01)

(52) U.S. Cl.
  CPC ......... *H04W 4/021* (2013.01); *H04W 52/223* (2013.01); *H04W 52/242* (2013.01); *H04W 64/00* (2013.01)

(56) References Cited

U.S. PATENT DOCUMENTS

| | | | |
|---|---|---|---|
| 7,616,654 B2 | 11/2009 | Moran, III et al. | |
| 7,742,436 B2 | 6/2010 | Carrillo et al. | |
| 7,958,041 B2 | 6/2011 | Stanforth et al. | |
| 8,095,098 B2 | 1/2012 | Brooks et al. | |
| 8,326,313 B2 | 12/2012 | McHenry et al. | |
| 8,411,766 B2 * | 4/2013 | Wu | H04L 5/0007 375/259 |
| 8,576,825 B2 | 11/2013 | Wu et al. | |
| 8,615,263 B2 | 12/2013 | Madon et al. | |
| 8,644,273 B2 | 2/2014 | Choi et al. | |
| 8,711,721 B2 | 4/2014 | Smith et al. | |
| 8,712,426 B2 | 4/2014 | Stine | |
| 8,818,283 B2 | 8/2014 | McHenry et al. | |
| 8,873,422 B2 | 10/2014 | Carbjal | |
| 8,938,271 B2 | 1/2015 | Srikanteswara et al. | |
| 8,964,824 B2 | 2/2015 | Garcia et al. | |
| 9,161,231 B2 | 10/2015 | Buddhikot et al. | |
| 2011/0125905 A1 | 5/2011 | Baucke et al. | |
| 2015/0289258 A1 * | 10/2015 | Wu | H04W 16/14 455/501 |
| 2015/0373554 A1 | 12/2015 | Freda et al. | |
| 2016/0088486 A1 | 3/2016 | Taher et al. | |
| 2017/0006475 A1 * | 1/2017 | Liu | H04B 17/336 |

OTHER PUBLICATIONS

Akyildiz, et al., A survey on Spectrum Management in Cognitive Radio Networks, IEEE Communications Magazine, pp. 40-48, Apr. 2008.

Commerce Spectrum Management Advisory Committee (CSMAC), Interference and Dynamic Spectrum Access Subcommittee, Interim Report, 72 pages May 19, 2010.

Stine, et al., An Introduction to Spectrum Management, MITRE Technical Report, 223 pages, Mar. 2004.

* cited by examiner

Slower spatial variations

Faster spatial variations

Analyzing the Use of Spectrum
  Objective: Maximizing the use of spectrum
  - *How much is the opportunity for sharing the spectrum?*
    - How much of the spectrum is underutilized in the space, time, and frequency dimensions?
    - How much of the spectrum could be shared using a certain sharing model?
    - How much of the available-spectrum is rendered inaccessible due to certain conservative assumptions?
  - *Is the recovery low?*
    - How much of the available-spectrum is recovered using a certain technique?
    - How much of the available-spectrum is lost due to false positives?
    - How much is the benefit of a certain fusion scheme over another?
    - How much is the impact of lack of knowledge of the propagation conditions on the recovery of the underutilized spectrum?
  - *Is the exploitation low?*
    - How much of the spectrum is not exploited? Why?
    - How much is the impact of directional transceivers?
    - How much is the spectrum used by a service? How to maximize the number of satisfied spectrum-accesses?

Defining and Regulating a Dynamic Spectrum-access Policy
  - How to dynamically define the spectrum-access rights based on the real-time RF-environment conditions for maximizing the use of spectrum?
  - How to quantify violation of the spectrum-access rights occurred for a certain wireless network during a certain time period within a certain region?
  - How to quantify violation of the spectrum-access rights by a specific transmitter?

Fig. 12

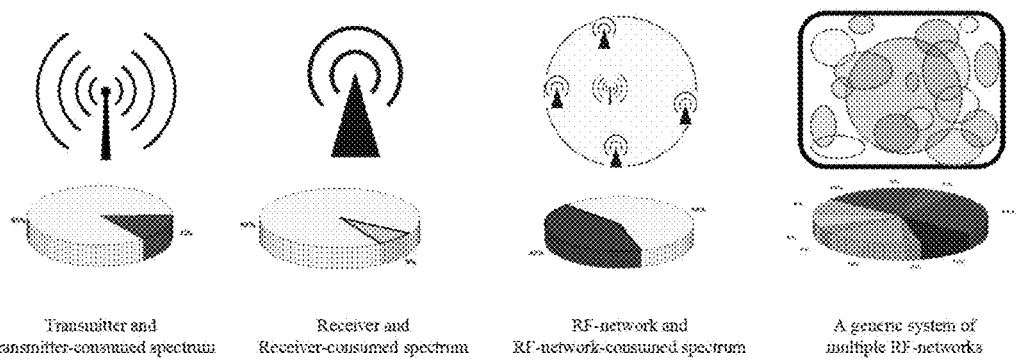

Transmitter and Transmitter-consumed spectrum | Receiver and Receiver-consumed spectrum | RF-network and RF-network-consumed spectrum | A generic system of multiple RF-networks

Fig. 13

T. Erpek, M. Lofquist, and K. Patton, "Spectrum Occupancy Measurements: Loring commerce centre, Limestone, Maine, september 18-20, 2007," Shared Spectrum Company Report, 2007.

METHODS AND SYSTEMS FOR SPECTRUM MANAGEMENT

CROSS-REFERENCE TO RELATED APPLICATIONS

This application claims priority to U.S. Provisional Application No. 62/246,589, filed on Oct. 26, 2015, and U.S. Provisional Application No. 62/327,078, filed on Apr. 25, 2016, the disclosures of which are incorporated herein by reference.

FIELD OF THE DISCLOSURE

The present disclosure relates to dynamic allocation of radio frequency spectrum.

BACKGROUND OF THE DISCLOSURE

In the conventional static and exclusive spectrum allocation paradigm, there is not much desirable radio frequency (RF) spectrum left to meet the ever-increasing demand from the existing and upcoming wireless services. It has been found that a significant amount of RF spectrum is underutilized in the space, time, and frequency dimensions.

In the past decade, several spectrum-sharing models have been investigated. Depending on the degree of sharing, the various spectrum-sharing approaches fall into exclusive spectrum use, static spectrum sharing, dynamic spectrum sharing, and pure spectrum sharing categories. A key challenge for the spectrum-sharing models is defining and enforcing spectrum-access rights under unknown RF-environment conditions and spectrum-access scenarios. Defining spectrum-sharing constraints to ensure minimum performance under the worst-case propagation conditions severely limits the opportunities to exploit the underutilized spectrum.

The dynamic spectrum sharing approaches have been evolving since the past decade. Depending on the degree of sharing, the various spectrum sharing approaches fall into exclusive spectrum use, static spectrum sharing, dynamic spectrum sharing, and pure spectrum sharing categories. Dynamic spectrum sharing differs from pure spectrum sharing in the sense that under pure spectrum sharing all services have equal spectrum-access priority. A previous work classified spectrum sharing approaches into open sharing model, dynamic exclusive use model, and hierarchical access model. The hierarchical access model could be further categorized into spectrum underlay model, non-prioritized spectrum overlay model, and prioritized spectrum overlay model. Spectrum underlay model imposes tight constraints on secondary spectrum-access in order to protect the spectrum-access rights of the incumbents. Under non-prioritized spectrum overlay model, a secondary spectrum-access is granted on a first come, first served basis while ensuring non-harmful interference to the receivers of the incumbent services. Under prioritized spectrum overlay model, certain services are assigned priority access privileges and the secondary access by these services is protected. Other non-prioritized secondary spectrum accesses are required to vacate if a priority user wishes to access spectrum. The proposed 3.5 GHz Citizens Broadband Radio Service (CBRS) is an example of prioritized spectrum overlay model.

In terms of articulating the spectrum access rights, the spectrum sharing mechanisms primarily resort to statically or dynamically defining a spatio-temporal boundary along with a fixed set of constraints. In this regard, the case study of dynamic spectrum sharing in UHF bands has brought out several technical, regulatory, and business difficulties.

In November 2008, Federal Communications Commission (FCC) released a Notice of Proposed Rule Making (NPRM) to allow the unlicensed radios to operate in the TV bands without causing harmful interference to the incumbent services. The Opportunistic Spectrum Access (OSA) of the unused UHF bands received a wide commercial interest for several potential wireless services; However, the performance estimation studies of OSA have revealed that the amount of the implied available spectrum is very limited to meet the increasing demand for RF spectrum. Moreover, the secondary users cannot ensure desired quality of service necessary for the business cases due to the secondary rights for accessing the spectrum. On the other hand, incumbents do not have any incentive for sharing the spectrum. Furthermore, the secondary access to the spectrum is very hard to regulate. Considering interference aggregation effects, dynamic nature of propagation conditions, and dynamic spectrum-access scenarios, the primary owners of the spectrum need a way to confirm that their receivers are not subjected to harmful interference and the service experience is not degraded. This requires the ability to reliably estimate the interference margin at the receivers and accordingly infer the maximum transmit-power at the secondary transmitter positions. Furthermore, the behavior of software defined radio devices could be altered with software changes and thus the service is exposed to attacks from the secondary users of the spectrum. In order to ensure protection of the spectrum rights, the spectrum-access constraints need to be enforceable.

We observe that the decisions for exercising spectrum-access in case of OSA are based on detection of primary transmitter signal using a certain specified radio sensitivity. In this case, the decision for spectrum-access is binary in nature. This gives rise to 'not enough spectrum for secondary usage' if the policy for shared spectrum-access is conservative and 'no guarantee for ensuring service quality' if the shared spectrum-access policy is aggressive. The binary nature of the spectrum-access decision cannot protect the spectrum rights of incumbents and requires the spectrum-access policy to be increasingly conservative to guard against interference aggregation. Therefore, when multiple secondary transmitters exercise spectrum-access, we need to quantitatively articulate the spectrum-access rights. This helps maximizing a spectrum-access opportunity without causing harmful interference. If technical and regulatory problems are solved, more and more incumbents will have an incentive to share the spatially, temporally, and spectrally unexploited spectrum.

FIG. 12 illustrates the need for a methodology to characterize and quantify the use of spectrum under dynamic spectrum sharing paradigm with the aid of a question-map. The question-map enumerates the quantitative decisions involved in the process of investigating the weaknesses of a spectrum sharing mechanism, comparing various algorithms and architectures for recovery and exploitation of the spectrum, and optimizing the spectrum sharing opportunities.

Traditionally the performance of spectrum recovery is measured in terms of the throughput for the secondary users and outage probability. The performance of detection of spectrum holes is also captured in terms of probability of missed detection and false positives. However, this characterization of the performance is in the context of spectrum sharing constraints defined by a certain spectrum sharing model or in terms of system-level objectives. In order to maximize the use of spectrum, we need a methodology that can characterize the performance of the recovery and exploitation of the underutilized spectrum in the space, time, and frequency dimensions.

The previous methodologies to define the use of spectrum and quantify its efficiency are based on the static spectrum assignment paradigm and are not suitable for the dynamic spectrum sharing paradigm. ITU defined spectrum utilization factor as product of the frequency bandwidth, geometric space, and the time denied to other potential users. However, spectrum utilization factor does not represent actual usage. For example, if a licensed user does not perform any transmissions, the spectrum is still considered to be used. It also cannot quantify the use of spectrum under spatial overlap of wireless services. The IEEE 1900.5.2 draft standard captures spectrum usage in terms of transceiver-model parameters and applies standard methods for ensuring compatibility between the spectrum sharing networks. Thus, the approach helps to ensure compatibility; however, it cannot characterize and quantify the use of spectrum and the performance of spectrum management functions.

BRIEF SUMMARY OF THE DISCLOSURE

Dynamic spectrum sharing marks a new era in the history of radio communications. With the static and exclusion spectrum allocation paradigm, the spectrum management functions need not explicitly consider the use of spectrum by the receivers. Under the new dynamic spectrum sharing paradigm, multiple spatially-overlapping heterogeneous wireless networks exercise a shared access to the spectrum. This necessitates considering the spectrum used by the individual transmitters and receivers.

Embodiments of the present disclosure provide the ability to articulate, define, and enforce the spectrum-access rights of the individual transceivers in terms of the spectrum used in the space, time, and frequency dimensions. This is especially important in terms of addressing the regulatory issues and ensuring protection of the spectrum rights under dynamic spectrum sharing paradigm.

Embodiments of the present disclosure capture the fine-grained variations in the use of spectrum in the space, time, and frequency dimensions. As the demand for spectrum is growing, it is important to exploit these fine granular spectrum-access opportunities and improve the efficiency of the spectrum management functions.

With discretization of the spectrum space, embodiments of the present disclosure enable quantification the use of spectrum. This ability to quantify the use of spectrum enables to treat spectrum as a commodity. It brings in simplicity, precision, and efficiency into the business models based on the new dynamic spectrum sharing paradigm. From a technical perspective, it facilitates characterizing and quantifying the performance of spectrum management functions directly in terms of the use of spectrum in the space, time, and frequency dimensions. This provides aid to investigate the issues in the recovery and exploitation of the underutilized spectrum. From an operational perspective, the spectrum-space discretization approach provides flexibility in terms of controlling the sharing of spectrum at the desired granularity.

DESCRIPTION OF THE DRAWINGS

For a fuller understanding of the nature and objects of the disclosure, reference should be made to the following detailed description taken in conjunction with the accompanying drawings, in which:

FIG. 12: Example questions in case of optimizing a typical dynamic spectrum sharing scenario. The questions shed light on the various quantitative decisions involved with regards to spectrum sharing and spectrum management. The question-map emphasizes on the need for a methodology to characterize and quantify the use of spectrum in order to effectively manage the use of spectrum.

FIG. 13: RF-entities and associated spectrum consumption spaces. The figure shows various entities within a generic system of wireless services sharing RF-spectrum: a transmitter, a receiver, and an RF-network. The rightmost picture shows a generalized spectrum sharing scenario with multiple spatially-overlapping heterogeneous wireless services sharing spectrum in the time, space, and frequency dimensions. The generalized topology emphasizes on the significance of spectrum sharing among heterogeneous wireless services without defining spatial, temporal, and spectral boundaries.

FIG. 16A characterizes the estimated unit-spectrum-space opportunities.

FIGS. 16B and 16C capture the spatial distribution of lost-spectrum-opportunity (FIG. 16B) and potential-spectrum-incursion within the geographical region (FIG. 16C). The RF-sensors are shown by upward-pointing triangle markers. The other 4 markers represent 4 transceiver pairs; a solid marker shows a transmitter and an unfilled marker shows a receiver.

DETAILED DESCRIPTION OF THE DISCLOSURE

Figure 1:
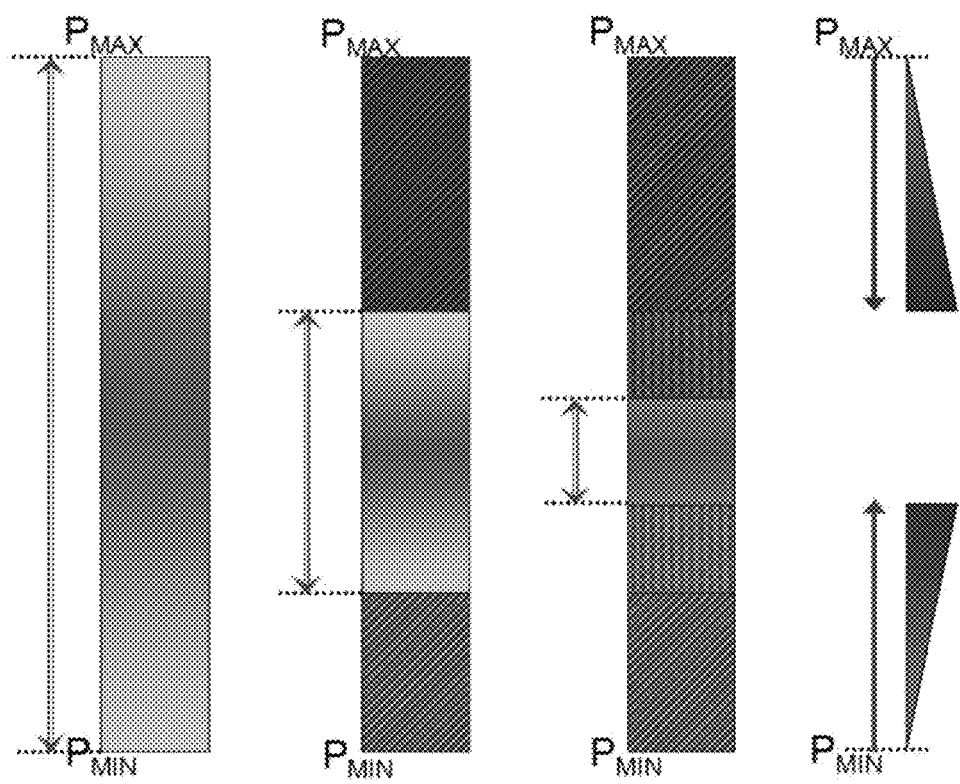
FIG. 1 illustrates the use of the spectrum at a point.

MUSE: A Methodology for Characterizing and Quantifying the Use of the Spectrum in the Space, Time, and Frequency Dimensions by Individual Transceivers.

Traditionally, the radio frequency (RF) spectrum has been statically and exclusively allocated. This static spectrum allocation paradigm results into an inefficient usage of the spectrum in time, space, and frequency dimensions. In order to meet the growing demand for the new and high bandwidth wireless services, the spectrum can be dynamically shared by multiple wireless service providers.

The dynamic spectrum sharing paradigm presents new challenges on technical, regulatory, and business fronts. For effective spectrum sharing, non-harmful interference needs to be ensured among multiple heterogeneous RF-systems under the dynamic RF-environment conditions. With the static and exclusive spectrum allocation paradigm, the spectrum-access parameters for a service are chosen so as to mitigate potential interference and ensure minimum performance under the worst-case conditions. Defining spectrum sharing constraints to ensure minimum performance under the worst-case propagation conditions severely limits the opportunities to exploit the underutilized spectrum. It would be beneficial to have the ability to define and enforce spectrum-access constraints that can maximize the availability and exploitation of the underutilized spectrum under dynamic RF environment conditions. In this regard, the aggregate interference effects, dynamic propagation conditions, and software defined capabilities bring in complexity to the regulation of dynamic spectrum-access. Furthermore, from a business perspective, it is also important to be able to flexibly and efficiently trade the spectrum in addition to solving the technical and regulatory issues.

In order to address the challenges for the adoption of the new paradigm, a methodology to characterize and quantify the use of spectrum in the space, time, and frequency dimensions (MUSE) is disclosed. MUSE is independent of the spectrum sharing models and can scale across various simple to advanced spectrum sharing use-cases. (The system model considers a generic collection of transceivers. Thus, MUSE can also be applied under traditional scenarios without spectrum sharing.) By characterizing the use of spectrum, MUSE facilitates articulating the spectrum-access rights in terms of the use of spectrum. This ability is advantageous in addressing several technical, regulatory, and business difficulties. Furthermore, by characterizing the use of spectrum, MUSE enables characterization of the spectrum management functions in the space, time, and frequency dimensions. This ability helps us to optimize the performance of spectrum management functions in order to maximize the use of spectrum.

Characterizing and Quantifying the Use of Spectrum

In order to define a methodology that enables characterizing the use of spectrum in the space, time, and frequency dimensions, it is helpful to first look into what constitutes the use of spectrum.

How is Spectrum Consumed?

Traditionally, spectrum is assumed to be consumed by transmitters; however, spectrum is also consumed by receivers in that receivers constrain the RF-power from the other transmitters. Traditionally, to guarantee successful reception, protection is provided in terms of guard-bands, separation distances, and constraints on the operational hours. Thus, the presence of receivers enforces limits on the interference-power in the space, time, and frequency dimensions. Accordingly, when access to spectrum is exclusive in the space, time, and frequency dimensions, the spectrum consumed by the receivers need not be separately considered.

System Model

Consider a generic system with multiple heterogeneous spatially-overlapping wireless services sharing the RF-spectrum. (Without allowing spatial-overlap of wireless services, spectrum sharing may lead to spatial fragmentation of coverage for a wireless service. Furthermore, as discussed above, imposing a spatial boundary on spectrum sharing can lead to suboptimal spectrum sharing.) An RF-link is defined as representing zero or one transmitter and one or more receivers exercising spectrum-access. (Zero transmitters in an RF-link is to include the use of spectrum by the receiver-only systems; for example, radio astronomy telescopes.) An RF-network represents an aggregate of RF-links. The aggregate of RF-networks sharing a spectrum space in the time, space, and frequency dimensions within a geographical region of interest is referred to herein as an RF-system. Consider also that a multiple RF-systems are sharing the spectrum in the time, space, and frequency dimensions within the geographical region of interest.

It is desirable to capture spectrum-access at the lowest granularity. In this regard, the RF-link represents the lowest granularity of spectrum-access.

Under the system model, transceivers may optionally employ directional transmission and reception in order to minimize interference. A receiver can withstand a certain interference when the received Signal to Interference and Noise Ratio (SINR) is greater than a receiver-specific threshold, $\beta$. (The threshold, $\beta$, represents the quality of a receiver and incorporates receiver-noise and other receiver technology imperfections. Thus, $\beta$ models the receiver-performance under the presently-disclosed methodology.)

Let $P_{MAX}$ represent the maximum permissible power at any point and $P_{MIN}$ represent the minimum power at any point in the system. $P_{MIN}$ could be chosen to be an arbitrary low value below the thermal noise floor. The difference between the maximum and the minimum spectrum consumption at a point represents the maximum spectrum consumption, $P_{CMAX}$, at a point and it is given by $$P_{CMAX} = P_{MAX} - P_{MIN} \qquad (1)$$

Definitions

Transmitter-Occupancy:

Transmitter-occupancy is the amount of spectrum consumed by a transmitter at a point in terms of RF-power occupied at the point.

Receiver-Liability:

Receiver-liability is the amount of spectrum consumed by a receiver at a point in terms of the constraint imposed on the RF-power that can be exercised at the point by a potential or an existing transmitter. Thus, it represents liability to the receiver in order to protect the receiver from harmful interference.

Discretized Spectrum-Space:

The spectrum consumed by a transmitter or a receiver is continuous in the space, time, and frequency dimensions. In order to facilitate characterization and quantification of the use of the spectrum within a geographical region, the total spectrum-space is divided into discrete units and the spectrum consumed by the transmitters and receivers in the unit spectrum-spaces is characterized. This discretized view of the spectrum in the space, time, and frequency dimensions is referred to herein as discretized spectrum-space.

A Unit Spectrum-Space:

A unit spectrum-space represents the spectrum within a unit area, in a unit time-quanta, and a unit frequency band.

RF-Entity:

RF-entity is used as a generic term for an entity exercising spectrum-access. An RF-entity may represent an individual transmitter, an individual receiver, an RF-Link, an RF-network, or an RF-system.

A Spectrum Consumption Space:

A spectrum consumption space captures the spectrum consumption by an RF-entity in the discretized spectrum-space. The unit of a spectrum consumption space is $Wm^2$. FIG. 13 shows different RF-entities and the associated spectrum consumption spaces.

The Total Spectrum-Space:

The total spectrum-space represents the spectrum in the space, time, and frequency dimensions within a geographical region of interest. Let the geographical region be discretized into $\hat{A}$ unit-regions, $\hat{B}$ unit-frequency-bands, and $\hat{T}$ unit-time-quanta. Thus, the total spectrum-space is given by $$\Psi_{Total} = P_{CMAX} \hat{T} \hat{A} \hat{B} \qquad (2)$$

The following attributes with a unit-spectrum-space are identified to characterize and quantify spectrum consumption spaces:

Unit-Spectrum-Space Occupancy:

Unit-spectrum-space occupancy is the amount of spectrum consumed by all the transmitters in a unit-spectrum-space.

Unit-Spectrum-Space Liability:

Unit-spectrum-space liability is the amount of spectrum consumed by all the receivers in a unit-spectrum-space.

Unit-Spectrum-Space Opportunity:

Unit-spectrum-space opportunity is the amount of spectrum available for consumption in a unit-spectrum-space.

Transmitter-Occupancy

The power received from a transmitter $t_n$ at a point $\rho$ in the spatial dimension is given by $$P_{r_\rho}(t_n) = P_{t_n} \min\{1, L(d(t_n, \rho)^{-\alpha})\}, \qquad (3)$$

where $P_{t_n}$ the transmit power of the transmitter and $d(t_n, \rho)$ is the distance between the transmitter $t_n$ and the point $\rho$ in the space. $\alpha$ is the path-loss exponent and $L(d(t_n, \rho)^{-\alpha})$ denotes the path-loss factor. Thus, (3) represents transmitter-occupancy of $t_n$ at the point $\rho$ in the geographical region.

Spectrum-Occupancy

The aggregate power received at a point $\rho$ is given by $$\bar{P}_\rho = \sum_n P_{r_\rho}(t_n) + W_\rho, \qquad (4)$$

where $W_\rho$ is the average ambient noise power at $\rho$. Thus, (4) represents the spectrum-occupancy at the point $\rho$ in the geographical region.

Unit-Spectrum-Space Occupancy

Considering a unit-spectrum-space defined by unit-region $\chi$, time-quanta $\tau$, frequency-band $\nu$, unit-spectrum-space occupancy, $\omega(\chi, \tau, \nu)$, is the spectrum occupancy at the sample point $\rho_0 \in \chi$, in the frequency band $v$, at an instant within the time-quanta $\tau$. Therefore, $$\omega(\chi,\tau,v) = \overline{P}_{\rho_0}, \quad (5)$$

The unit for unit-spectrum-space occupancy is W.

Receiver Interference-Margin

Let $r_{n,m}$ be the $m^{th}$ receiver of the $n^{th}$ RF-link. The amount of interference power receiver $r_{n,m}$ can tolerate, that is the interference-margin for $r_{n,m}$, is given by $$\check{P}_{r_{n,m}} = \frac{P_{r_{n,m}}(t_n)}{\beta_{n,m}} - W_{r_{n,m}}. \quad (6)$$

The unit of interference-margin is W.

Interference-margin $\check{P}_{r_{n,m}}$ can be viewed as the upper-bound on the transmit power of an interferer at a spatial separation of zero. The limit on the interference power is characterized at a point $\rho$ in space in terms of the receiver-imposed upper bound on the interference power.

$$\check{I}(r_{n,m},\rho) = \check{P}_{r_{n,m}} \min\{1, L(d(\rho, r_{n,m})^\alpha)\}, \quad (7)$$

where $d(\rho, r_{n,m})$ is the distance between the receiver $r_{n,m}$ and the point p in the space. Note that the receiver imposed constraint on the interference power increases with increasing separation.

Receiver-Imposed Interference-Opportunity

Let $\breve{I}(r_{n,m}, \rho)$ denote the proportional aggregate interference power (that is, the aggregate RF-power received at p from all the interference sources for receiver $r_{n,m}$) seen at a distant point p; then the interference opportunity imposed by this receiver at $\rho$ is given by the difference between the upper bound on the interference power and the proportional aggregate interference power.

$$\breve{I}(r_{n,m},\rho) = \check{I}(r_{n,m},\rho) - \hat{I}(r_{n,m},\rho), \quad (8)$$

Note that when $\breve{I}(r_{n,m}, \rho)$ is negative, the receiver $r_{n,m}$ is experiencing harmful interference.

Spectrum-Opportunity

By combining the limits on the maximum interference power imposed by all the receivers, from all the RF-links in the system, net interference-opportunity at a point $\rho$ is $$\bar{I}_\rho = \min_n \left( \min_m (\breve{I}(r_{n,m}, \rho)) \right), \quad (9)$$

The net interference-opportunity at a point is referred to as spectrum-opportunity.

Unit-Spectrum-Space Opportunity

Unit-spectrum-space opportunity, $\gamma(\Psi, \tau, v)$, is defined as the spectrum-opportunity at the sample point $\rho_0 \in \chi$, in frequency band $v$, at an instant within the time-quanta $\tau$. Therefore, $$\gamma(\Psi,\chi,v) = \bar{I}_{\rho_0}, \quad (10)$$

The unit for unit-spectrum-space opportunity is W.

Unit-Spectrum-Space Liability

Unit-spectrum-space liability—the spectrum consumed by all the receivers in a unit-spectrum-space—is obtained by subtracting the unit-spectrum-space occupancy and unit-spectrum-space opportunity from the maximum spectrum-consumption. Therefore, $$\phi(\chi,\tau,v) = P_{CMAX} - (\omega(\chi,\tau,v) + \gamma(\chi,\tau,v)), \quad (11)$$

The unit for unit-spectrum-space liability is W.

Characterizing the spectrum consumed by an RF-entity at a point enables characterizing the spectrum consumption space associated with the RF-entity. In this regard, the spectrum consumed by an individual transceiver in a unit-spectrum-space is characterized.

Receiver-Liability

Receiver-liability—the amount of spectrum consumed by an individual receiver at a point—is obtained by subtracting the aggregate transmitter-occupancy and the interference-opportunity caused by the receiver from the maximum spectrum-consumption. Therefore, $$L_\rho(r_{n,m}) = P_{CMAX} - (\overline{P}_\rho + \breve{I}(r_{n,m}, \rho)) \quad (12)$$

The unit of receiver-liability is W.

Transmitter-occupancy in a unit-spectrum-space is given by transmitter-occupancy at the sample point $\rho_0 \in \chi$, in frequency band $v$, at an instant within the time-quanta $\tau$. Therefore, $$\omega_{t_n}(\chi,\tau,v) = P_{r_{\rho_0}}(t_n). \quad (13)$$

Receiver-liability in a unit-spectrum-space is given by receiver-liability at the sample point $\rho_0 \in \chi$, in frequency band $v$, at an instant within the time-quanta T. Therefore, $$\phi r_{n,m}(\chi,\tau,v) = L_{\rho_0}(r_{n,m}). \quad (14)$$

Quantifying a Spectrum Consumption Space

A spectrum consumption space associated with an RF-entity is quantified by aggregating the spectrum consumed by the RF-entity across all the unit-spectrum-spaces within a geographical region. A few spectrum consumption spaces towards maximizing the use of spectrum are identified in Table I.

TABLE I

Example Spectrum Consumption Spaces

| Spectrum Consumption Space | Description | Significance |
| --- | --- | --- |
| Transmitter-consumed spectrum | The spectrum consumed by a specified transmitter. | It can be used in the context of defining and enforcing spectrum-access rights for a single transmitter |
| Receiver-consumed spectrum | The spectrum consumed by a specified receiver. | It can be used in the context of defining and enforcing spectrum-access rights for a single receiver |
| Utilized-spectrum | The spectrum consumed by all transmitters in the system. | It can be used in the context of analysis and optimization of the spectrum consumed by transmitters. |
| Forbidden-spectrum | The spectrum consumed by all the receivers in the system. | It can be used in the context of analysis and optimization of the spectrum consumed by receivers. |
| Available-spectrum | The spectrum not consumed by all the transmitters and receivers in the system and therefore available* for consumption. | It can be used in the context of analysis of the potential of spectrum sharing and for assigning spectrum-access footprints. |

(*In a spectrum sharing scenario, the spectrum-sharing policy defines certain constraints which determine what spectrum can be exercised for shared-access. The spectrum implied available by a spectrum-sharing policy, that is, the implied-available spectrum, is distinguished from the available-spectrum.)

Transmitter-Consumed Spectrum:

The spectrum consumed by a transmitter within a geographical region is obtained by aggregating transmitter-occupancy across the unit-spectrum-spaces. Therefore, $$\Omega(t_n) = \sum_{k=1}^{\hat{B}} \sum_{j=1}^{\hat{T}} \sum_{i=1}^{\hat{A}} \omega_{t_n}(X_i, \tau_j, v_k). \quad (15)$$

Receiver-Consumed Spectrum:

The spectrum consumed by a receiver within a geographical region is obtained by aggregating receiver-liability across the unit-spectrum-spaces. Therefore, $$\Phi(r_{n,m}) = \sum_{k=1}^{\hat{B}} \sum_{j=1}^{\hat{T}} \sum_{i=1}^{\hat{A}} \phi_{r_{n,m}}(X_i, \tau_j, v_k). \quad (16)$$

Utilized-Spectrum ($\Psi_{Utilized}$):

Utilized-spectrum is the spectrum consumed by all the transmitters within a geographical region. Utilized-spectrum is obtained by summing the unit-spectrum-space occupancy across all the unit-spectrum-spaces. Therefore, $$\Psi_{utilized} = \sum_{k=1}^{\hat{B}} \sum_{j=1}^{\hat{T}} \sum_{i=1}^{\hat{A}} \omega(X_i, \tau_j, v_k). \quad (17)$$

Forbidden-Spectrum ($\Psi_{Forbidden}$):

Forbidden-spectrum is the spectrum consumed by all the receivers within a geographical region. The forbidden-spectrum is quantified by aggregating unit-spectrum-space reliability across all the unit-spectrum-spaces. Therefore, $$\Psi_{forbidden} = \sum_{k=1}^{\hat{B}} \sum_{j=1}^{\hat{T}} \sum_{i=1}^{\hat{A}} \phi(X_i, \tau_j, v_k). \quad (18)$$

Available-Spectrum ($\Psi_{Available}$):

Available-spectrum is the spectrum not consumed transmitters and receivers and therefore available for consumption. The available-spectrum within a geographical region is obtained by summing unit-spectrum-space opportunity across all the unit-spectrum-spaces. Therefore, $$\Psi_{available} = \sum_{k=1}^{\hat{B}} \sum_{j=1}^{\hat{T}} \sum_{i=1}^{\hat{A}} \gamma(X_i, \tau_j, v_k). \quad (19)$$

For completeness, the relationship between these spectrum consumption spaces is expressed. (In fact, this relationship follows from the definition of unit-spectrum-space reliability.) The spectrum consumption in a unit-spectrum-space is specified in terms of the unit-spectrum-space occupancy, unit-spectrum-space opportunity, and unit-spectrum-space liability. From (11), $$\omega(\chi,\tau,v)+\phi(\chi,\tau,v)+\gamma(\chi,\tau,v)=P_{CMAX}. \quad (20)$$

Summing over all the $\hat{A}$ unit-regions in the geographical-region, $\hat{B}$ frequency-bands, $\hat{T}$ unit-time quanta, yields the following relation between utilized-spectrum, forbidden-spectrum, and available-spectrum.

$$\Psi_{utilized} + \Psi_{forbidden} + \Psi_{available} = \Psi_{Total}. \quad (21)$$

Quantifying Other Spectrum Consumption Spaces

One can identify a spectrum consumption space with regard to the desired objective and quantify the spectrum consumption space to facilitate analysis and optimization. For example, one can quantify the harmful interference caused by a single transmitter to the cochannel receivers. This can be useful in terms of regulation of a spectrum-access policy.

Characterizing and Quantifying Performance of the Spectrum Management Functions

Similar to characterization of the use of spectrum in terms of spectrum consumption spaces, the performance of a spectrum management function is characterized in terms of the spectrum management function (SMF) spaces. In this regard, spectrum management function spaces are identified in order to capture the performance of a spectrum management function in the discretized spectrum-space.

Consider an attribute, θ, characterizing the performance of a spectrum management function at a point. For example, in case of spectrum recovery, the error in the estimated unit-spectrum-space opportunity may represent the performance of spectrum recovery or in case of spectrum exploitation, the amount of spectrum not exploited in a unit-spectrum-space can capture weaknesses of a spectrum exploitation mechanism. Table III describes the SMF spaces associated with spectrum sharing, spectrum recovery, and spectrum exploitation functions.

The SMF attribute θ is characterized in a unit-spectrum-space defined by unit-region Ψ, time-quanta τ, frequency-band v in terms of the SMF attribute at the sample point $\rho_0 \in \chi$, in the frequency band v, at an instant within the time-quanta τ. Therefore, $$\theta(\chi,\tau,v)=\theta_{\rho_0}. \quad (22)$$

The SMF space within a geographical region is obtained by summing the SMF attribute across the unit-spectrum-spaces. Therefore, $$\Theta = \sum_{k=1}^{\hat{B}} \sum_{j=1}^{\hat{T}} \sum_{i=1}^{\hat{A}} \theta(X_i, \tau_j, v_k). \quad (20)$$

The present disclosure may be embodied as a method for quantifying transmitter-consumed spectrum in a geographical region. The method includes dividing the geographical region into a set of unit-spectrum-spaces. Each unit-spectrum-space comprises a unit-region of space having a sample point, a time quanta, and a frequency band. A transmitter-occupancy is calculated at each sample point for each transmitter in the geographical region. A transmitter-occupancy is calculated in each unit-spectrum-space within the geographical region. The transmitter-occupancy of each unit-spectrum-space is then aggregated to yield the transmitter-consumed spectrum for the geographical region.

In another embodiment, the present disclosure is a method for quantifying receiver-consumed spectrum in a geographical region. The method includes calculating a receiver-liability at each of a plurality of sample points and for each receiver in the geographical region. Each sample point of the plurality of sample points corresponds to a unit-region of the geographical region. A receiver-liability is calculated in each unit-spectrum-space within the geographical region. The receiver-liability of each unit-spectrum-space is aggregated to yield the receiver-consumed spectrum in the geographical region.

In another embodiment, the present disclosure is a method for quantifying utilized-spectrum in a geographical region. The method includes calculating the power received from each transmitter in the geographical region at each of a plurality of sample points. Each sample point of the plurality of sample points corresponds to a unit-region of the geographical region. A spectrum-occupancy is calculated for each sample point by aggregating the power received from each transmitter at the respective sample point and the average ambient noise power at the respective sample point. A spectrum-occupancy is calculated for each unit-spectrum-space within the geographical region. The spectrum-occupancy of each unit-spectrum-space is aggregated to yield the utilized-spectrum in the geographical region.

In another embodiment, the present disclosure is a method for quantifying forbidden-spectrum in a geographical region. The method includes calculating the power received from each transmitter in the geographical region at each of a plurality of sample points. Each sample point of the plurality of sample points corresponds to a unit-region of the geographical region. A spectrum-occupancy is calculated for each sample point by aggregating the power received from each transmitter at the respective sample point and the average ambient noise power at the respective sample point. A spectrum-occupancy is calculated for each unit-spectrum-space within the geographical region. A receiver interference-margin is calculated for each receiver in the geographical region at each of the plurality of sample points. A receiver-imposed interference-opportunity is calculated for each receiver in the geographical region at each of the plurality of sample points. A spectrum-opportunity is calculated at each sample point. The spectrum-opportunity is a minimum value of the calculated receiver-imposed interference-opportunity for each receiver at the respective sample point. A unit-spectrum-space opportunity is calculated for each unit-spectrum-space within the geographical region. A unit-spectrum-space liability is calculated by subtracting the unit-spectrum-space occupancy and unit-spectrum-space opportunity from the maximum spectrum-consumption for each unit-spectrum-space within the geographical region. The unit-spectrum-space liability of each unit-spectrum-space is aggregated to yield the forbidden spectrum in a geographical region.

In another embodiment, the present disclosure is a method for quantifying available-spectrum in a geographical region. The method includes calculating a receiver interference-margin for each receiver in the geographical region at each of a plurality of sample points. Each sample point of the plurality of sample points corresponds to a unit-region of the geographical region. A receiver-imposed interference-opportunity is calculated for each receiver in the geographical region at each of the plurality of sample points. A spectrum-opportunity is calculated at each sample point. The spectrum-opportunity is a minimum value of the calculated receiver-imposed interference-opportunity for each receiver at the respective sample point. A unit-spectrum-space opportunity is calculated for each unit-spectrum-space within the geographical region. The unit-spectrum-space opportunity of each unit-spectrum-space is aggregated to yield the available spectrum for the geographical region.

In another embodiment, the present disclosure is a method for determining whether to grant a request for spectrum access. The request comprises a desired frequency band, a desired time period, a requested transmit power, and a requested transmitter location. The method includes electronically receiving the request for spectrum access. A geographical region is determined based on the requested transmitter location and requested transmit power. Current spectrum consumption information for transmitters and receivers in the geographical region is received from an RF sensor network. The utilized-spectrum is quantified for the geographical region. The available-spectrum is quantified for the geographical region. The request for spectrum access is granted or denied according to the utilized-spectrum and available-spectrum.

In another aspect, the present disclosure is embodied as a system for estimating the use of spectrum in a geographical region. The geographical region comprises a set of unit-spectrum-spaces, each unit-spectrum-space having a unit-region of space with a sample point, a time quanta, and a frequency band. The system includes a communication port for receiving spectrum parameters. The spectrum parameters may be received from, for example, a network of RF sensors. The communication port may be, for example, a communication port of a computer, an RF receiver to receive out-of-band communications from the RF sensor network, or other communication ports that will be apparent in light of the present disclosure. The received spectrum parameters include one or more of spectrum-occupancy, spectrum-opportunity, and spectrum-liability. The system includes a processor configured to receive information from the communication port.

In another embodiment, the system includes the RF sensor network and the processor is in electronic communication with the RF sensors of the RF sensor network. Each RF sensor is located at a corresponding sample point (the location where the RF sensor samples RF information).

The processor is programmed to receive the spectrum parameters from the communication port (or the RF sensors of the RF sensor network, as the case may be) and to calculate one or more of a transmitter-consumed spectrum, receiver-consumed spectrum, utilized-spectrum, a forbidden-spectrum, and an available-spectrum.

Muse: Illustration and Discussion

With reference to FIG. 1, illustration of the methodology begins with an abstract view of the use of spectrum at a single point. The total spectrum at a point is determined by $P_{MAX}$ and $P_{MIN}$.

If there are no transmitters and receivers in the system, transmitter-occupancy and receiver-liability at this point are zero; the spectrum-opportunity will be maximum, that is, $P_{CMAX}$. The spectrum-opportunity represents maximum RF-power that can be used by a future transmitters while ensuring non-harmful interference at the receivers. This scenario is captured by the leftmost bar.

If a transmitter and its receiver is added, non-zero transmitter-occupancy and receiver-liability are observed. It is note that receiver-liability, being the limit on the maximum RF-power at a point, grows from $P_{MAX}$ towards $P_{MIN}$. Thus, the higher the minimum SINR for successful reception, then the higher is the receiver-liability. The transmitter-occupancy and receiver-liability shape the spectrum-opportunity at a point. The middle bar shows this scenario and it is observed that the spectrum-opportunity has reduced due to the constraint imposed by receiver.

As more and more transceivers are added in the system, the spectrum-opportunity is further reduced. This scenario is shown in the rightmost bar. In this case, the spectrum-occupancy captures the aggregate value of the transmitter occupancy from the individual transmitters. With regard to receivers, different receivers impose a different constraint on the RF-power sourced from the point. The effective constraint at this point is determined by the receiver having the highest receiver-liability at the point.

Next, a simplistic setup is considered and the spectrum consumed by the transceivers is illustrated at an arbitrary point in the system. Consider a 4.3 km×3.7 km geographical region, and assume that $P_{MAX}$ is 1 W or 30 dBm; $P_{MIN}$ is −200 dBm. Ambient noise floor is assumed to be −106 dBm (for channel bandwidth of 6 MHz). Distance dependent path-loss model is used with path-loss exponent of 3.5. The minimum desired SINR at receiver for successful reception, β, is assumed to be 3 dB. A transmitter is positioned at (1000, 1200), receiver is positioned at (1000, 2100), and spectrum consumption is quantified at an arbitrary point, (2250, 1800). The scenario I in Table II shows the spectrum consumption at this point in terms of transmitter-occupancy, receiver-liability, and spectrum-opportunity.

TABLE II

Spectrum Consumption at a Point Under Three Scenarios

| S/N | Transmit Power | Receiver position | Receiver SINR | Transmitter-Occupancy | Spectrum-Opportunity | Receiver-Liability |
|---|---|---|---|---|---|---|
| I | −24 dBm | (1000, 2100) | 12.0 dB | −132.6 dBm | 11.84 dBm | 29.93 dBm (984 mW) |
| II | 6 dBm | (1000, 2100) | 42.0 dB | −102.6 dBm | 30 dBm | −200 dBm (0 mW) |
| III | 6 dBm | (1000, 2500) | 17.5 dB | −102.6 dBm | 19.0 dBm | 29.64 dBm (920 mW) |

In scenario II, the transmitter power is changed from −24 dBm to 6 dBm; accordingly, the spectrum consumption by the transmitter at point (2250, 1800) changes from −132.6 dBm to −102.6 dBm. With regard to the spectrum consumption by the receiver, it is observed that SINR at the receiver is significantly improved and consequently the tolerance for interference is improved. Thus, the receiver can withstand interference of 30 dBm generated from position (2250, 1800) without getting harmfully interfered. Since, the spectrum-opportunity is maximum (30 dBm or $P_{MAX}$) in case II, the spectrum consumption by the receiver is minimal (−200 dBm or $P_{MIN}$).

In Scenario III, the receiver is moved farther from its transmitter; this results in reduced SINR and consequently reduced tolerance to interference. Thus, the spectrum-opportunity caused by the receiver at (2250, 1800) is lowered from 30 dBm to 19 dBm and the spectrum consumed by the receiver increases to 920 mW.

A. Quantification of a Spectrum Consumption Space

After characterizing spectrum consumption at an arbitrary point, a spectrum consumption space within a geographical region of interest is characterized. Consider a 4.3 km×3.7 km geographical region with 676 hexagonal unit regions with each side 100 m long. Let the maximum RF-power at a point, $P_{MAX}$, in the unit regions be 30 dBm, that is 1 W. Let $P_{MIN}$ be −200 dBm. Assume 6 MHz spectral range as unit bandwidth and a 10 second time period as unit time. In this scenario, the maximum spectrum consumption in the geographical region, in a 6 MHz spectral band, in a 10 second time period is 676 Wm² as given by (2). The propagation conditions are modelled by distance dependent path-loss model with the path-loss exponent of 3.5.

Figure 4:
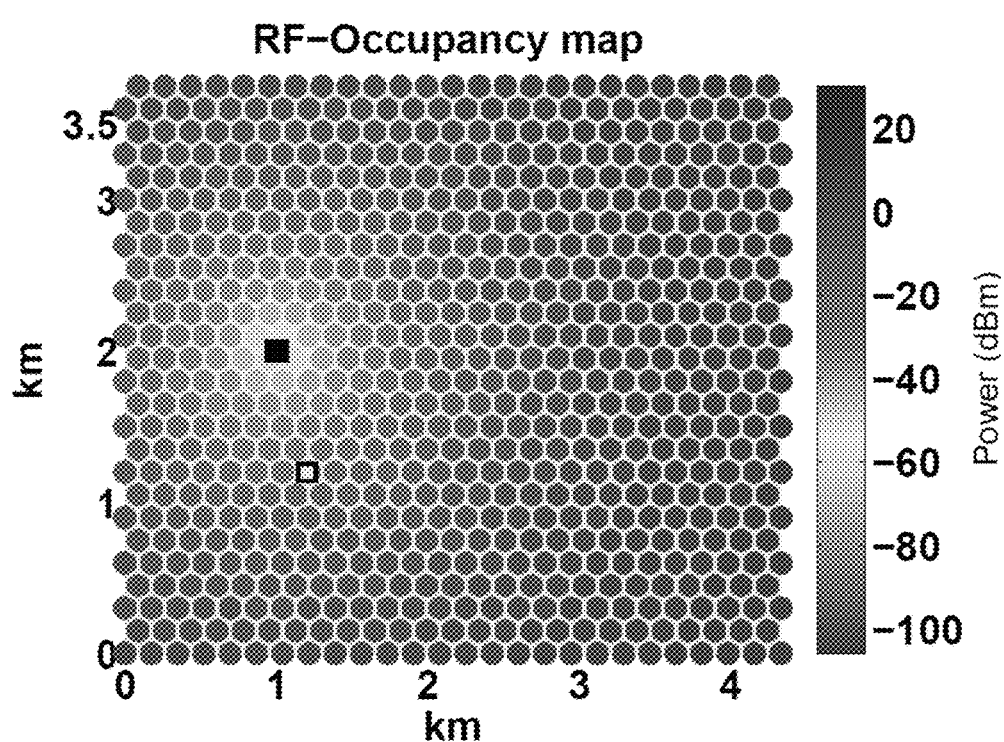
FIG. 4: Spectrum-consumption space of an individual transmitter. The figure shows spatial distribution of the transmitter-occupancy in the unit-spectrum-spaces within a geographical region. Thus, it captures the spectrum consumed by a transmitter within the geographical region. The transmitter is shown by a solid square and the receiver is shown by a non-solid square.
Figure 5A:
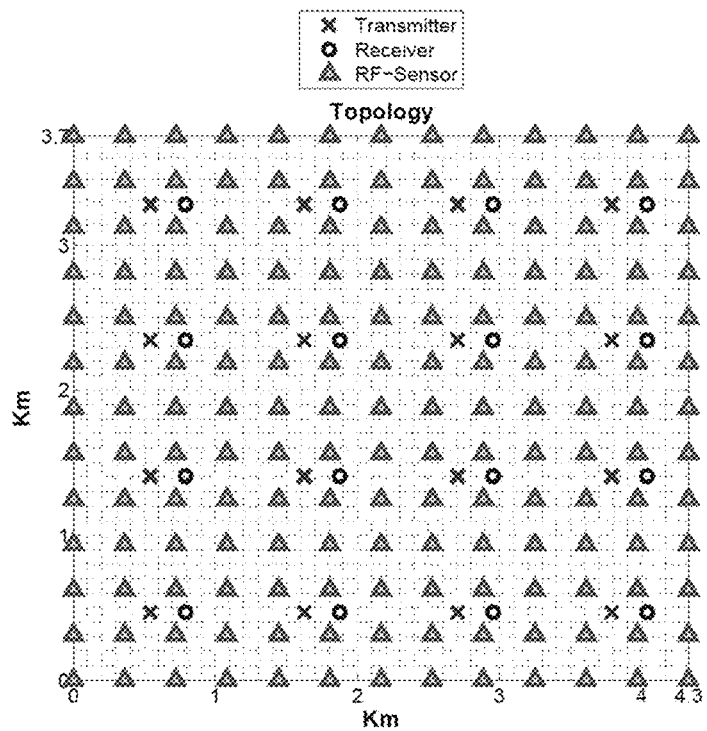
FIGS. 5A-5D: Estimation of the available spectrum. The RF-sensors estimate the spectrum-access parameters of all cochannel transmitters and estimate spectrum opportunity in the unit regions within the geographical region. The lost-available spectrum and potentially-degraded spectrum capture the positive and negative errors in the estimation of spectrum opportunity, respectively. The 16 cochannel transmitters have distinct cyclostationary signatures. When the SINR at the receivers is lower, the spatial footprint of the receiver-consumed spectrum is larger and the spectrum-opportunity estimation errors are pronounced.
Figure 5B:
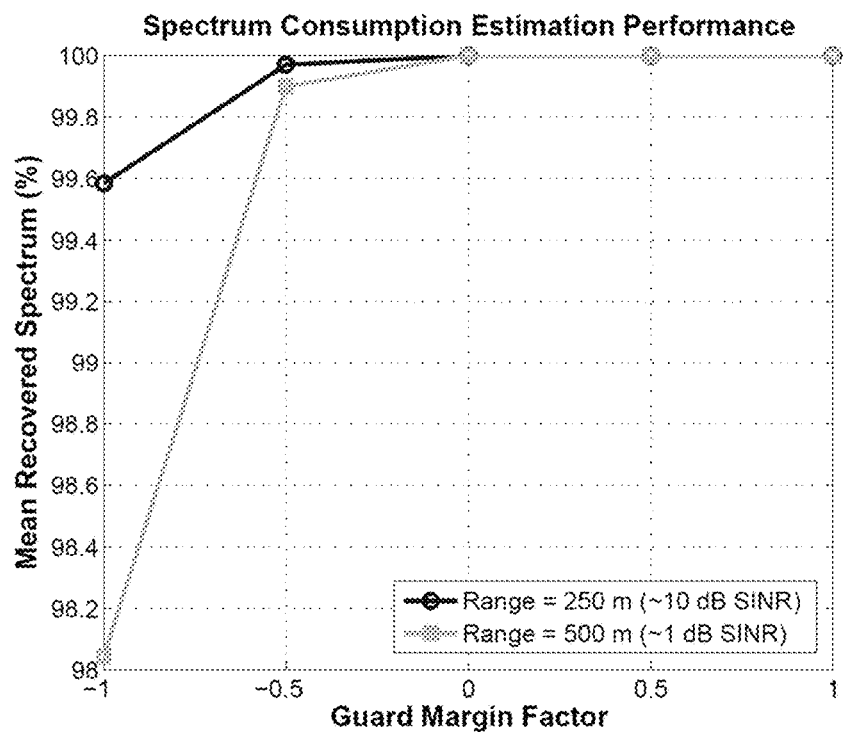
Figure 5C:
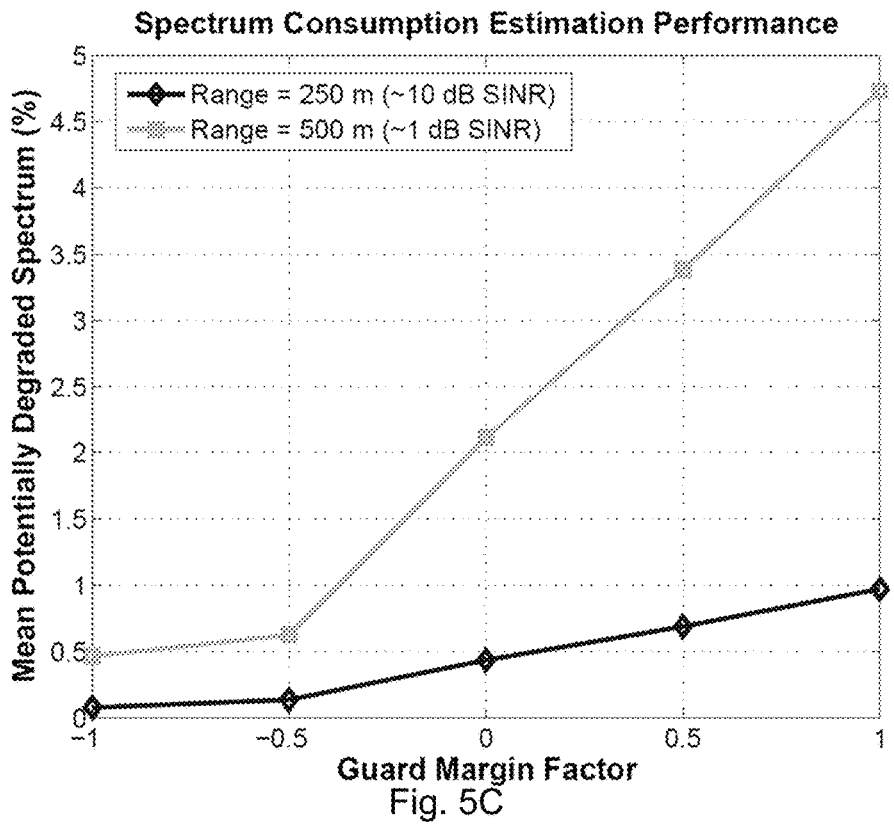
Figure 5D:
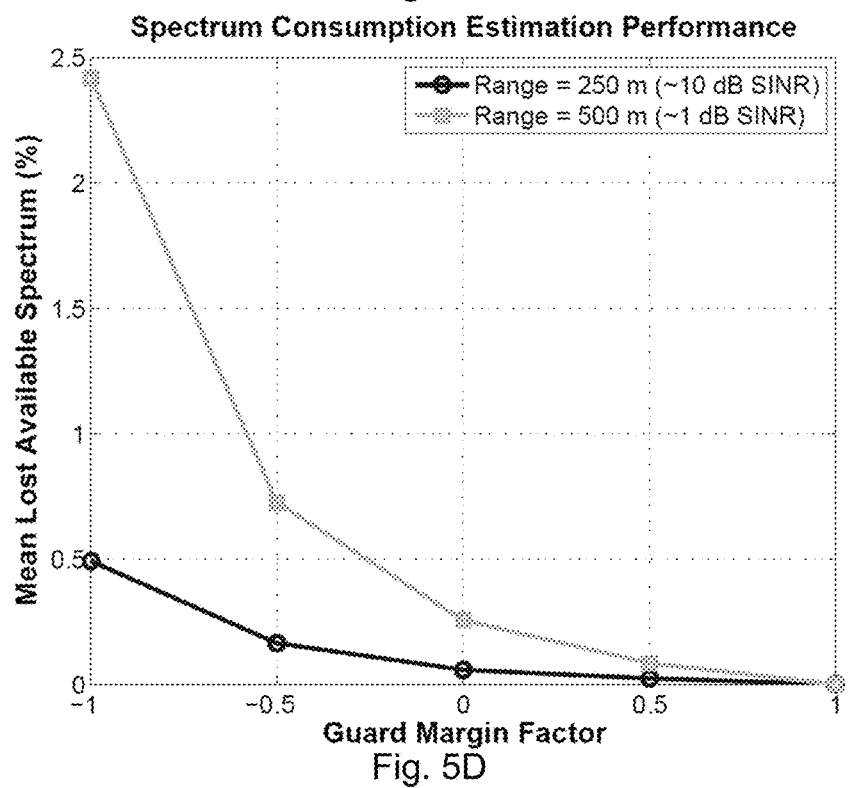

1) Spectrum Consumed by a Transmitter:

First, the spectrum consumption space for an individual transmitter is reviewed. FIG. 4 illustrates the spectrum consumed by a transmitter within a geographical region according to (15). The transmitter is located at (1000, 2000) and is exercising omnidirectional transmission with transmit power of 15 dBm. The spectrum consumed by the transmitter is $1.8 \times 10^{-8}$ Wm² ($2.7 \times 10^{-9}$% of the total spectrum space).

Figure 14:
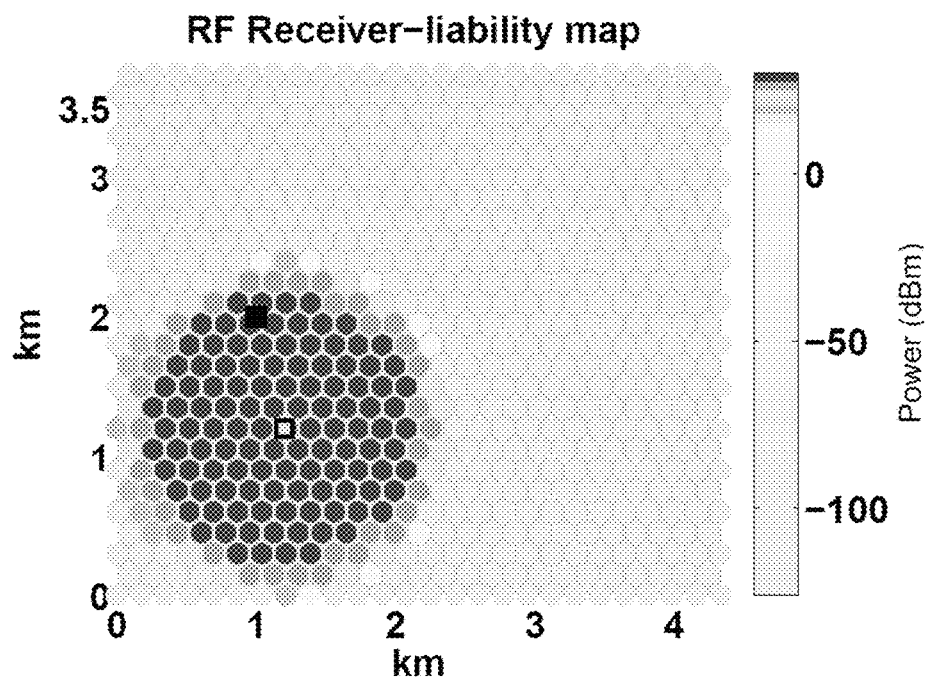
FIG. 14: Spectrum consumption space of an individual receiver. The figure shows the spatial distribution of receiver-liability in the unit-spectrum-spaces within a geographical region. Thus, it captures the spectrum consumed by a receiver within the geographical region. The transmitter is shown by a solid square and the receiver is shown by a non-solid square.

2) Spectrum Consumed by a Receiver:

FIG. 14 illustrates the spectrum consumption space for a receiver according to (16). The receiver is located at (1200, 1200) and is exercising omni-directional reception requiring minimum SINR of 6 dB and the actual experienced SINR at the receiver is 33 dB. It is noted that as the distance from a receiver increases, a cochannel transmitter can exercise higher transmission power. Thus, the liability for ensuring non-harmful interference to the receiver goes down with the distance from the receiver. The spectrum consumed by the receiver is 112.4 Wm² (16.6% of the total spectrum space).

Figure 15:
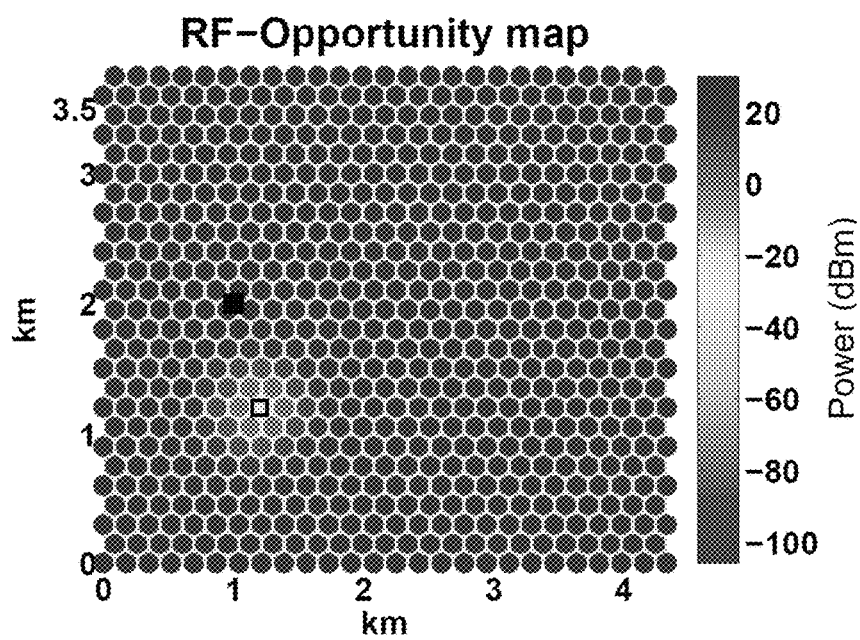
FIG. 15: Available-spectrum within a geographical region. The figure shows the spatial distribution of unit-spectrum-space opportunity within a geographical region. Thus, it captures the available-spectrum within the geographical region. The transmitter is shown by a solid shape and the receiver is shown by a non-solid shape. It is observed that the unit-spectrum-space opportunity near the receiver is lower in order to ensure non-harmful interference at the receiver.

3) Available-Spectrum:

The spectrum space not consumed by the transmitters and receivers is the available-spectrum within a geographical region. FIG. 15 depicts spatial distribution of unit-spectrum-space opportunity given by (19) for the above topology. The available-spectrum space is 563.6 Wm² (83.4% of the total spectrum space).

The spectrum consumed by an RF-entity is the sum of the spectrum consumed by all the transmitters and receivers within the RF-entity. Thus, the spectrum consumed by the RF-link in this case is 112.4 Wm². The spectrum consumed by an RF-link has been considered as a parameter for scheduling RF-links in order to minimize spectrum consumption and improve the performance of scheduling in [23].

B. Quantification of a Spectrum Management Space

The performance of spectrum sharing depends primarily on the spectrum-sharing policy which defines what spectrum can be considered available for exploitation, the optional spectrum recovery function which defines how efficiently the available spectrum is recovered, and the spectrum exploitation function which influences how efficiently the recovered available spectrum is assigned for satisfying spectrum-access requests. (The management of spectrum may vary across different spectrum sharing models. Market-based approach to spectrum sharing presumes a spectrum pool while overlay approach requires recovering the under-utilized spectrum.) In this regard, Table III identifies a few example spectrum management spaces.

Figure 16A:
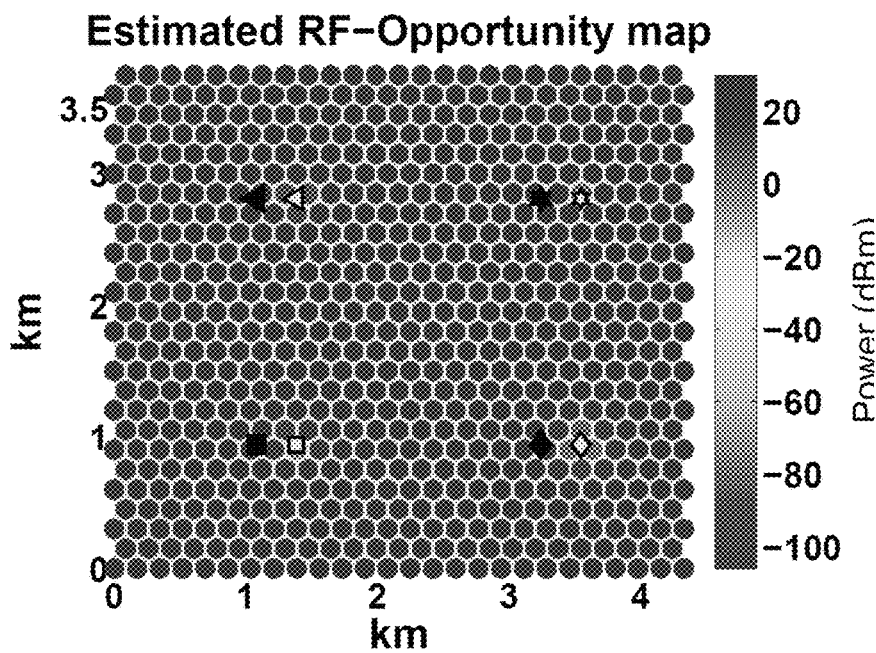
FIGS. 16A-16C: Performance analysis of recovering the available-spectrum. A dedicated RF-sensor network with 16 RF-sensors estimates the unit-spectrum-space opportunities exploiting signal-cyclostationarity across the unit-spectrum-spaces within a geographical region. The errors in the detection, geolocation, and transmit-power estimation result into lost-available spectrum and potentially-incursed spectrum.
Figure 16B:
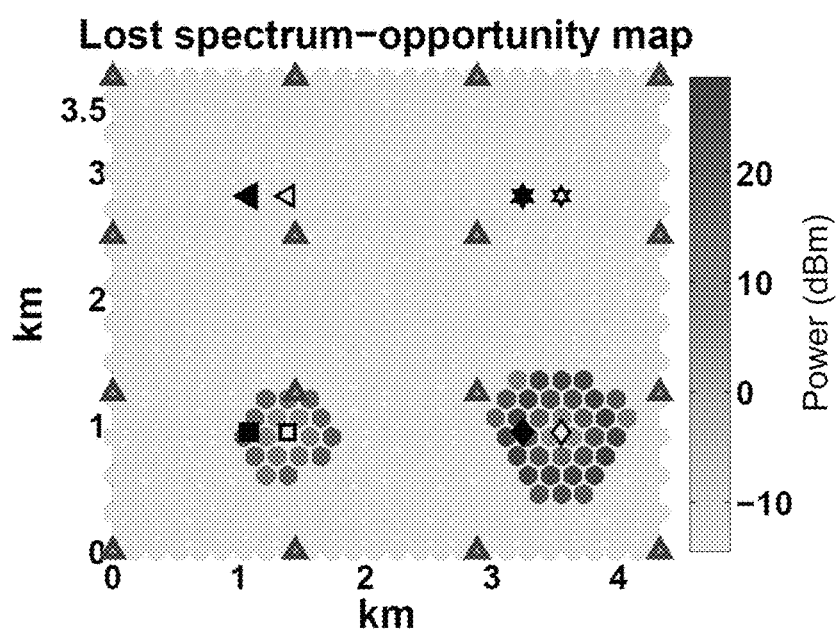
Figure 16C:
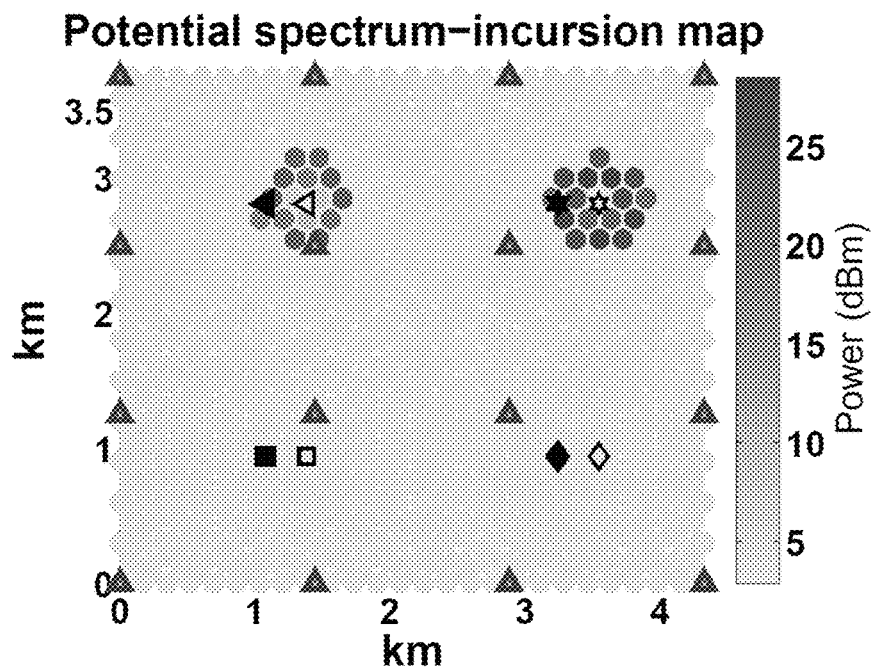

Quantifying these spectrum management spaces enables comparison, analysis, and optimization of spectrum sharing. Consider the recovery of the underutilized spectrum by estimating the unit-spectrum-space opportunities within a geographical region using a dedicated RF-sensor network. The RF-sensors sense the RF-environment in order to detect the presence of cochannel transmitters, geolocate the transmitters, and estimate the transmit-power of the transmitters. A missed-detection, false-positive, an error in geo-location implies error in the estimated spectrum-opportunity. A negative error implies spectrum opportunity is lost in the unit-spectrum-space and a positive error may potentially lead to harmful interference. FIGS. 16A-16C show the performance of spectrum recovery in term of estimation of unit-spectrum-space opportunity given by (10). It was observed that 630.7 W (99.3% of the total spectrum) of the available-spectrum within the geographical region has been recovered; 12.7 W (2% of the total spectrum) of the available-spectrum has been lost and 8.4 W (1.3% of the total spectrum) of the not available-spectrum has been erroneously considered available for exploitation.

C. Considerations while Applying MUSE

1) Unit-Spectrum-Space Dimensions:

The granularity of spectrum sharing identifies the smallest portion of spectrum-space for which spectrum-access rights could be defined and enforced. In this regard, a unit spectrum-space represents the lowest granularity of spectrum sharing. Thus, the granularity of spectrum sharing plays a key role in determining the sampling rate in the space, time, and frequency dimensions. In favor of standardization, an alternate perspective could be choosing the unit-spectrum-space dimensions; thus, the unit-spectrum-space granularity could determine the spectrum-sharing granularity. In this case, we suppose the population-density and the propagation environment characteristics can play a key role in determining the spatial granularity of a unit-spectrum-space. The temporal granularity for a unit-spectrum-space can be considered to depend upon the traffic characteristics. The transceiver technology and its frequency agility would typically drive the granularity of a unit-spectrum-space in the frequency dimension.

Figure 17A:
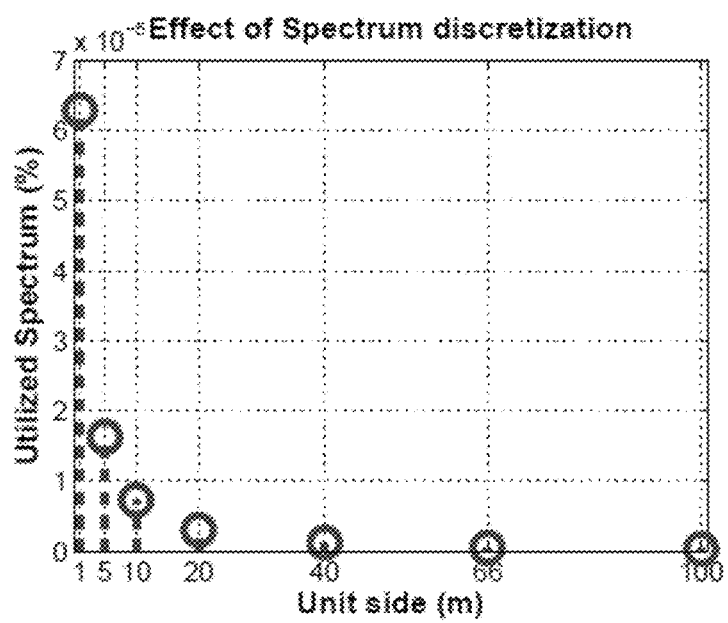
FIG. 17A-17C: Spatial sampling of spectrum consumption. The plots capture the effect of spatial sampling rate on the quantification of the spectrum consumption spaces. The X axis shows the length of the hexagonal unit regions. The spectrum consumption in a unit-spectrum-space is governed by spectrum consumption at the sample point in the unit-spectrum-space. Thus, it is observed that the spectrum consumption spaces are more accurately captured with higher sampling rate.
Figure 17B:
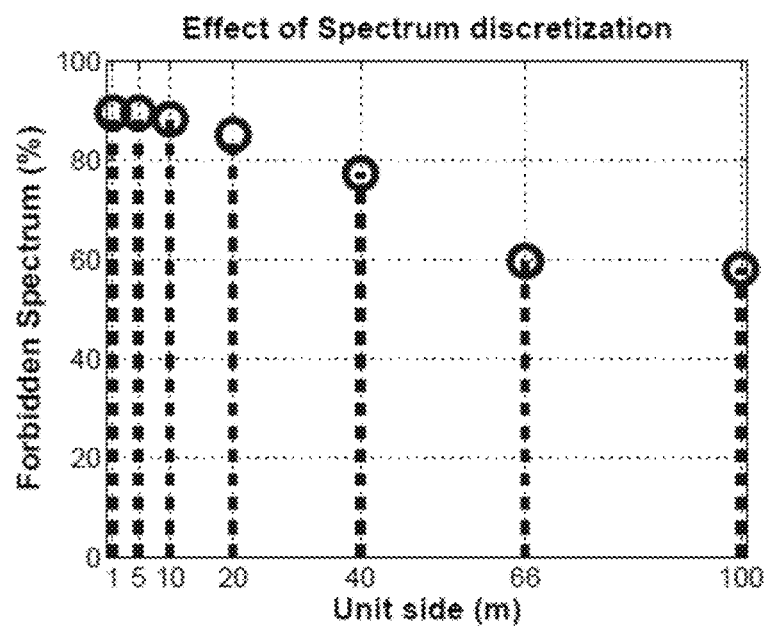
Figure 17C:
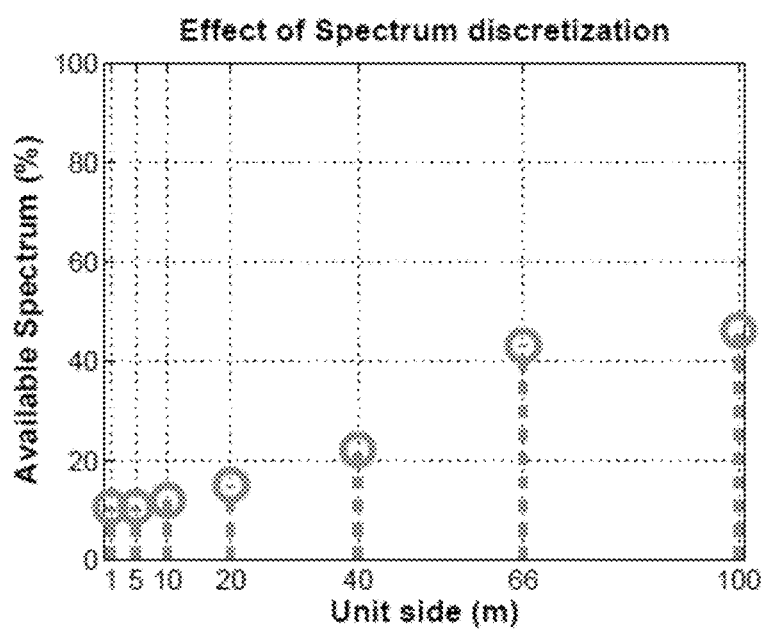

FIGS. 17A-17C illustrate the impact of spatial sampling rate on quantification of the spectrum consumption spaces. The spatial sampling rate varies from 1 m to 100 m. When the side of the unit-region is 1 m, the quantified value of the total spectrum space is much higher as compared to the total spectrum space when the side of the unit-region is 100 m. It is noted that the worst-case distance between the sampling point and a transceiver can be half the spatial sampling rate. Here, the worst-case setup with the transceiver distances kept maximum from the unit-spectrum-space sampling points was used. When the sampling rate is lower, the spectrum consumed by transmitters and receivers in the unit-spectrum-spaces is more accurately captured by the unit-spectrum-space occupancy and opportunity respectively. Consequently, it is noted that the quantity of transceiver consumed spectrum decreases with sampling rate and that of available spectrum increases with sampling rate.

TABLE III

Example Spectrum Management Spaces

| Functionality | Spectrum Management Space | Description |
| --- | --- | --- |
| Spectrum Sharing | Implied-Available Spectrum Space | The portion of available spectrum implied accessible under the constraints imposed by a spectrum-sharing policy. |
| | Implied-Guard Spectrum Space | The portion of available spectrum that has been (usually intentionally) treated as not available spectrum. |
| | Implied-Incursed Spectrum Space | The portion of non-available spectrum that has been erroneously treated as available spectrum. |

TABLE III-continued

Example Spectrum Management Spaces

| Functionality | Spectrum Management Space | Description |
| --- | --- | --- |
| Spectrum Recovery | Recovered-Available Spectrum Space | The portion of implied-available spectrum that has been recovered for exploitation. |
| | Lost-Available Spectrum Space | The portion of implied-available spectrum that has been erroneously treated as not available for exploitation. |
| | Potentially-Incursed Spectrum Space | The portion of non-available spectrum that has been erroneously treated as available for exploitation. |
| Spectrum Exploitation | Exploited-Available Spectrum Space | The portion of the recovered-available spectrum consumed by transmitters and receivers. |
| | Unexploited-Available Spectrum Space | The portion of the recovered-available spectrum not consumed by transmitters and receivers. |
| | Incursed Spectrum Space | The portion of the non-available spectrum consumed by transmitters and receivers. |

2) Statistical Modeling of Spectrum Consumption:

With MUSE, spectrum consumed by transceivers was captured with a sampling approach instead of using a statistical technique. Thus, the methodology captures the instantaneous use of the spectrum independent of the characteristics of the propagation environment. It is possible to enrich the representation of the spectrum consumption in a unit-spectrum-space using statistical methods; for example, similar to statistical modeling of the RF-environment, capturing spectrum consumption within a unit-spectrum-space with multiple samples and applying statistical functions.

3) Spectrum Use in the Code Dimension:

MUSE is agnostic of the waveforms employed by the RF-entities. Thus, it does not capture the spectrum use in the code dimension of spectrum-access.

Embodiments of the presently-disclosed dynamic spectrum-sharing paradigm enables efficient use of the underutilized spectrum by enabling a shared access to the spectrum. In another embodiment, the problem of defining and enforcing spectrum-access rights is addressed based on real-time RF-environment conditions and realistic spectrum-access scenarios. The present approach is based on articulating the spectrum-access rights in terms of actual spectrum use in the space, time, and frequency dimensions by an individual transceiver. The spectrum-space is divided into discrete unit-spectrum spaces and the use of spectrum by an individual transceiver is estimated in the space, time, and frequency dimensions. The estimation of used spectrum enables estimating the amount of spectrum that is potentially available for sharing with further RF users. A spectrum-access mechanism (SAM) can then define the spectrum-access rights for future spectrum-access requests in terms of the allowed quantified use of spectrum by each of the transceivers. The defined spectrum-access rights can be enforced with estimation of the actual use of spectrum.

In order to estimate the use of spectrum in real time, an external dedicated RF-sensor network may be employed. In this way, the RF-sensors learn the fine-grained RF-environment and estimate the spectrum-access attributes of the transmitters. To passively estimate the spectrum-access attributes in the presence of cochannel interference, embodiments of the presently-disclosed technique may employ detection, location estimation, and transmit-power estimation algorithms that exploit signal cyclostationarity. The estimates of the spectrum-access parameters by multiple RF-sensors are fused to estimate the use of spectrum in the unit-spectrum-spaces within a geographical region.

Limitations of Previous Approaches

A. Defining and Enforcing a Dynamic Spectrum Policy

Most of the work in the identification and exploitation of the underutilized spectrum focuses on the detection of the primary transmitter signal. A simplistic approach for detecting a transmitter signal is to employ some form of energy detection. The transmitter-signal detection approach implies identifying a spatio-temporal spectrum-access opportunity and its performance is driven by the radio sensitivity. A cooperative approach helps to improve the performance of transmitter-signal detection. However, the primary weakness of the energy detection approach is that it is not suited under unknown noise and cochannel interference conditions. In this regard, primary transmitter signal is detected exploiting signal cyclostationarity.

If the primary transmitter is far away from the secondary users, it is possible to access the underutilized spectrum while ensuring non-interference to the primary receivers. In this regard, localization of transmitters based on the received signal strength was explored.

The approach in the present disclosure focuses on estimating the use of spectrum by the individual transmitters and receivers and thereby characterizing the spectrum-access opportunities in the space, time, and frequency dimensions. This provides two advantages. The first advantage is estimating the use of spectrum brings out the fine-grained spectrum-access opportunities and improves the recovery of underutilized spectrum. Thus, the spectrum available for the secondary users is improved. With estimation of use in real-time, the spectrum-access parameters could be dynamically and efficiently chosen while protecting the existing uses of the spectrum. Thus, estimation of the use of spectrum enables a spectrum-access policy to be defined.

The second advantage is in terms of enforcing a spectrum-access policy. As the use of spectrum by an individual transceiver is estimated, violations of the assigned spectrum-access policy could be detected. Thus, estimating the use of spectrum enables automation of the spectrum-access regulation under dynamic spectrum sharing.

B. Dynamicity of the RE Environment

For the past several decades, spectrum management has been centered on handcrafting allocation of the spectrum and imposing spatio-temporal boundaries to ensure minimum performance under worst-case conditions. Dynamic spectrum sharing requires the ability to characterize the unknown propagation conditions and spectrum-access scenarios in real-time and adapt the use of spectrum in response to the changes in the RF-environment.

Characterization of the Use of Spectrum

The dynamic spectrum-sharing paradigm enables multiple spatially-overlapping wireless networks to share the spectrum. For characterizing the spectrum consumption according to the present disclosure, the spectrum consumed by the individual transmitters and receivers needs to be considered. While the RF power received from a transmitter decreases with increasing distance from the transmitter, the constraint imposed by a receiver on the tolerable interference power increases with increasing distance from the receiver.

C. Illustration

Use of the Spectrum at a Point: The methodology identifies the following five basic attributes that characterize the use of spectrum at a point in the system:
1. the maximum permissible power at any point in the system, Puff. This is usually driven by human safety considerations.
2. the minimum power at any point in the system, $P_{MIN}$. This could be an arbitrary low value below the noise-floor.
3. spectrum occupancy representing the spectrum consumed by all the transmitters.
4. spectrum liability representing the spectrum consumed by all the receivers in terms of constraining the interference power and thereby the occupiable RF power with respect to $P_{MAX}$.
5. spectrum opportunity representing the remainder of the RF-power, that is, opportunity for using the spectrum by existing or future transceivers.

Again, considering, FIG. 1 illustrates the use of spectrum at a point. The leftmost bar captures the maximum ($P_{MAX}$-$P_{MIN}$) spectrum-opportunity (shown with double arrow) at a point when no transceivers are present. The middle bar shows the spectrum consumed by a transmitter and its receiver. The rightmost bar shows the spectrum consumed by two pairs of transceivers. Here, we note that the spectrum-occupancy grows from $P_{MIN}$ towards $P_{MAX}$ while spectrum-liability representing a constraint on the occupiable RF-power grows from $P_{MAX}$ towards $P_{MIN}$. The spectrum opportunity continues decreasing as the transceivers consume more and more of the spectrum at a point.

Figure 2:
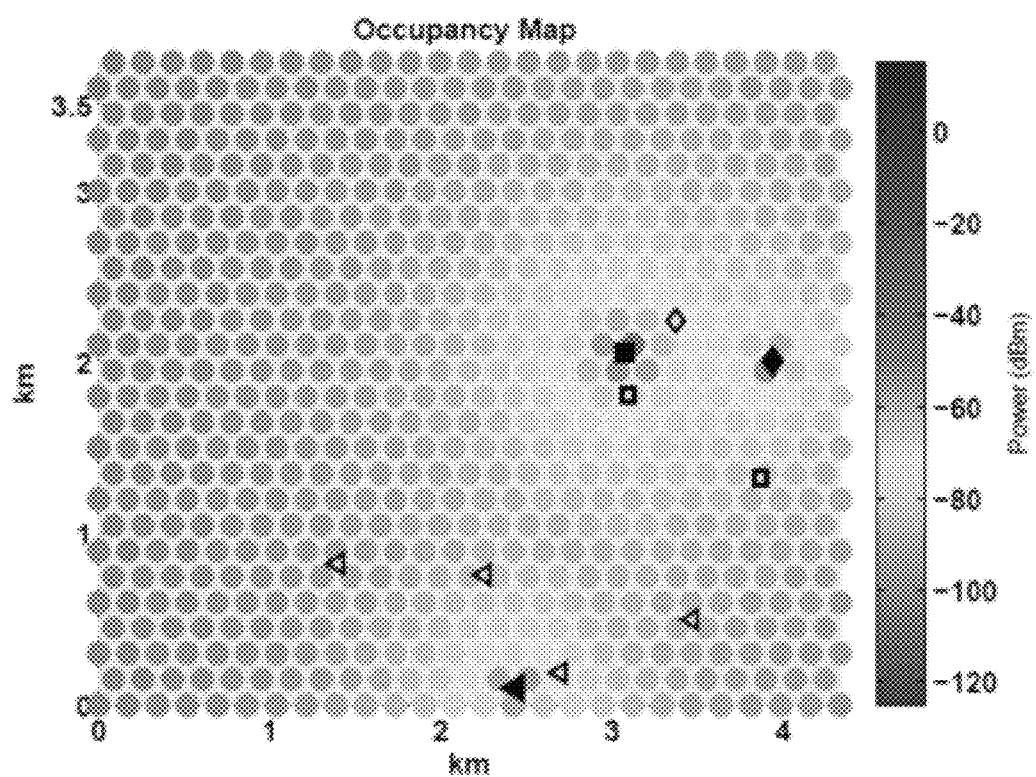
FIG. 2: Single-band spectrum-occupancy map showing the aggregate RF power across the unit-regions within a geographical region. Transmitters and receivers in a single network have the same shape; transmitter is solid.
Figure 3:
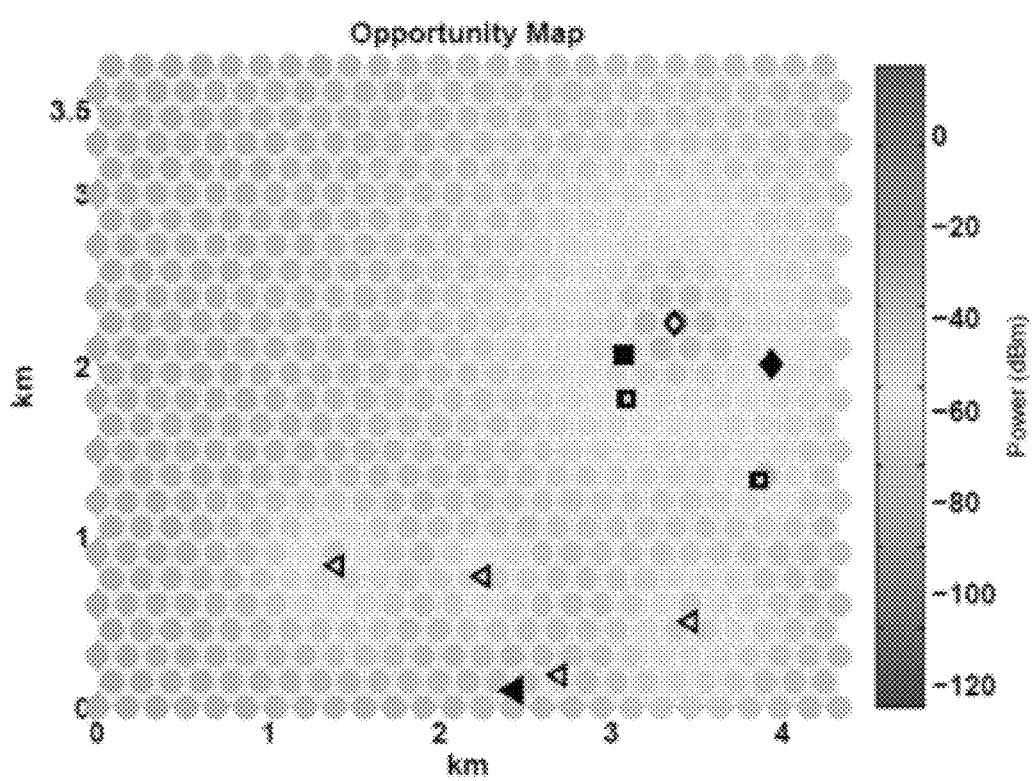
FIG. 3: Single-band spectrum-opportunity map showing the RF power that each unit-region can tolerate given the presence of the shown networks. High-opportunity regions are green; low are red.

Use of the Spectrum in a Geographical Region:

By characterizing the spectrum-occupancy across the unit-spectrum-spaces within a geographical region, we can identify the utilized-spectrum. Similarly, by characterizing the spectrum-opportunity across the unit-spectrum-spaces, we can identify the available-spectrum. FIGS. 2 and 3 capture the spatial distribution of spectrum occupancy and spectrum opportunity respectively.

Estimating the Use of the Spectrum

Using the methodology to characterize the use of the spectrum, the spectrum consumed by individual transceivers and the spectrum available for potential users can be estimated.

A. Sub Problems

The spectrum consumed by transmitters in the space, time, and frequency dimensions is dependent on the actual (as against the maximum) transmit power and the antenna directionality employed during transmission. Similarly, the spectrum consumption by receivers in the space, time, and frequency dimensions is dependent on the minimum signal to interference and noise ratio (SINR) required for successful reception and the antenna directionality employed during reception.

In order to passively estimate the spectrum used by a transmitter, it is advantageous to:
  detect the active transmitters
  estimate the position of the transmitters
  estimate the transmit-power and the radiation pattern
  estimate the transmitter occupancy at a sample point across all the unit-spectrum-spaces.

It is assumed the receiver-parameters are specified during the request for accessing spectrum to the spectrum-access management infrastructure. This is to avoid the worst-case assumptions regarding the receiver position and spectrum-access parameters. In order to estimate the available spectrum, it is advantageous to:

estimate the received-power from all the cochannel transmitters at all the cochannel receivers
estimate the SINR at each of the cochannel receivers
estimate the spectrum-opportunity at a sample point across all the unit-spectrum-spaces.

B. Estimating the Transmitter Spectrum Access Attributes

The enforcement of the spectrum access rights may use a passive technique for estimating use of the spectrum. The techniques exploiting signal cyclostationarity do not require coherency, are tolerant to noise and cochannel interference, and provide good performance under low SINR conditions.

Algorithms exploiting signal cyclostationarity for the purpose of signal detection, received power estimation, and TDOA estimation have been presented. Here, the approach is briefly described in the context of estimation of the location and transmit-power of the transmitter.

Detecting a Transmitter Signal:

For signal detection, the second-order statistics of each signal are exploited through the spectral correlation function (SCF). The technique only requires the knowledge of the cyclic frequency of the transmitted signal.

Estimating the Received Signal Power:

Exploiting the knowledge of SCF for the unit-power version of the transmitter-signal, a least-squares estimation problem is formulated in order to estimate the received signal power.

Estimating the Transmit-Power:

In order to estimate the transmit-power, each RF-sensor estimates the received-power from the transmitter. Using the estimated position of the transmitter, the estimated mean path-loss exponent (PLE), and the estimated shadowing loss, the transmit-power is estimated as seen by an RF-sensor.

Estimating the Position of a Transmitter:

A method of maximizing the measured SCF was employed by phase alignment for obtaining a TDOA estimate. The method requires knowledge of the transmitter cycle frequency and synchronization between the RF-sensors. For the purposes of TDOA estimation, the candidate RF-sensors were chosen based on their estimated received power at the RF-sensors. a least-squares position estimation technique was employed in order to estimate position of the transmitter based on the TDOAs. TDOA estimation is sensitive to multipath and hence it is subject to errors. Due to an overdetermined system of equations, with least squares solution, the error in the location estimation is minimized.

C. Characterizing the Propagation Environment

Estimating the transmit-power from the received-power estimate requires the knowledge of the propagation environment. Since the transmit-power estimation is very much sensitive to the path-loss exponent and shadowing, real-time enforcement of a dynamic spectrum-access policy cannot rely on the assumed propagation parameters. In this regard, the mean path-loss and shadowing variance is estimated at a fine granularity using a dense RF-sensor network.

The geographical region is divided into multiple fine-grained unit-sections and consider a log-normal shadow fading environment within each unit-section. To facilitate real-time characterization in the presence of cochannel interference, the path-loss and shadowing variance within each of the unit-sections are estimated using monitoring signals with known transmit-power and exploiting signal-cyclostationarity.

D. Estimating Spectrum Occupancy and Spectrum Opportunity

The fusion center uses the estimated spectrum-access parameters of all the cochannel transmitters and estimates the spectrum-occupancy and spectrum-opportunity at the sample-points in each of unit-regions in the geographical area under interest.

Censoring:

The spectrum-occupancy estimate quality depends on the performance of the detection, received-power estimation, and geolocation sub-algorithms. In this regard, the RF-sensors that are far away from a certain transmitter or the RF-sensors that are very close to the cochannel interference source cannot accurately estimate the transmitter spectrum-access parameters and therefore introduce errors in the estimation of spectrum-occupancy and spectrum-opportunity. To improve the estimation performance, estimated-SINR-based censoring of the position estimates and the received-power estimates from each of the RF-sensors are employed.

Incorporating Directionality:

Using the shadowing profile information, the estimated transmitter spectrum-access parameters from an RF-sensor, and the known receiver spectrum-access parameters, the fusion center estimates spectrum-occupancy and spectrum-opportunity perceived by each of the non-censored RF-sensors. This is especially helpful considering directional transmission. In this case, the received power from a directional transmitter at the individual RF-sensors is different and the spectrum-consumption footprint for the directional transmitter can be accordingly estimated. The directionality of the receiver antennas is considered while estimating the spectrum-opportunity within the unit-regions.

Fusion:

For each unit-region, there are multiple spectrum-occupancy and spectrum-opportunity estimates from each of the RF-sensors. In order to facilitate choosing a conservative or an aggressive estimate, a guard-margin factor is defined and a single value from the distribution is chosen. The value of the guard-margin factor ranges from −1 to 1. The lower boundary represents the most conservative behavior (selecting the minimum spectrum-opportunity estimate from the distribution) and the upper boundary represents the most aggressive behavior (selecting the maximum spectrum-opportunity estimate from the distribution).

Exemplary Embodiment

A. Setup

Consider a 4.3 km×3.7 km geographical region. The utilized and available spectrum in a single 6 MHz wide frequency band at a given instant of time is estimated (single unit-time-quanta). The maximum power at any point $P_{MAX}$ is considered 30 dBm or 1 W. The minimum power at any point $P_{MIN}$ is considered to be −192 dBm. The minimum desired SINR for successful reception is considered to be 3 dBm. The thermal noise floor is −106 dBm considering channel bandwidth of 6 MHz. The geographical region is divided into 676 hexagonal cells with each side of 100 m. Thus, the total spectrum in the geographical region is 676 $Wm^2$.

The errors in estimation of the use of spectrum can be captured at various levels. For example, detection errors in terms of missed detections and false positives, TDOA estimation errors, position estimation errors, received-power estimation errors, transmit-power estimation errors, and finally the spectrum occupancy and spectrum opportunity estimation errors. In the scope of this embodiment, the resulting spectrum-occupancy and spectrum-opportunity errors are illustrated.

It is noted that a positive error in spectrum opportunity implies loss of the available spectrum while a negative error may lead to potential harmful interference at some of the receivers in the system. These two effects are captured in terms of the lost-available spectrum and potentially-degraded spectrum.

B. Estimating the Spectrum Access Footprint of a Single Transmitter

FIG. 4 illustrates the spectrum consumed by a transmitter within a geographical region. The transmitter is located at (1000, 2000) and is exercising omnidirectional transmission with transmit power of 15 dBm. The RF-power from the transmitter can be estimated at any of the unit-regions in accordance with the estimated fine-grained shadowing profile. For example, at (1000, 2400), the power received from this transmitter is estimated to be −66 dBm. It is noted that exploiting signal cyclostationarity enables the RF power to be estimated at a point when multiple transmitters are simultaneously exercising spectrum-access in the same frequency band within a geographical region. The estimated use of spectrum by a specific transmitter can be applied for validating a spectrum-access policy.

C. Estimating the Available Spectrum

Next, the available spectrum is estimated in case of multiple cochannel transmitters. It is noted that the SINR at the RF-sensors can be poor with respect to many of the transmitters due to proximity with other cochannel transmitters; therefore, when there are a large number cochannel transmitters, accurate spectrum consumption estimation requires a large number of RF sensors.

FIG. 5 shows the estimation performance with 16 transceiver-pairs and 169 RF-sensors. As the accuracy of spectrum-opportunity estimation depends on the receiver-SINR, the SINR is varied at a receiver by varying the receiver's distance from its transmitter. The 16 transmitters employ distinct cyclostationary signatures. It is observed that the RF-sensors used with 16 cochannel networks accomplish reasonable spectrum consumption estimation performance assuming no shadowing. Shadow fading introduces significant errors into estimation of the transmit-power and consequently in the estimation of spectrum occupancy and spectrum opportunity. In this regard, the shadowing profile is characterized at a fine granularity.

Figure 11A:
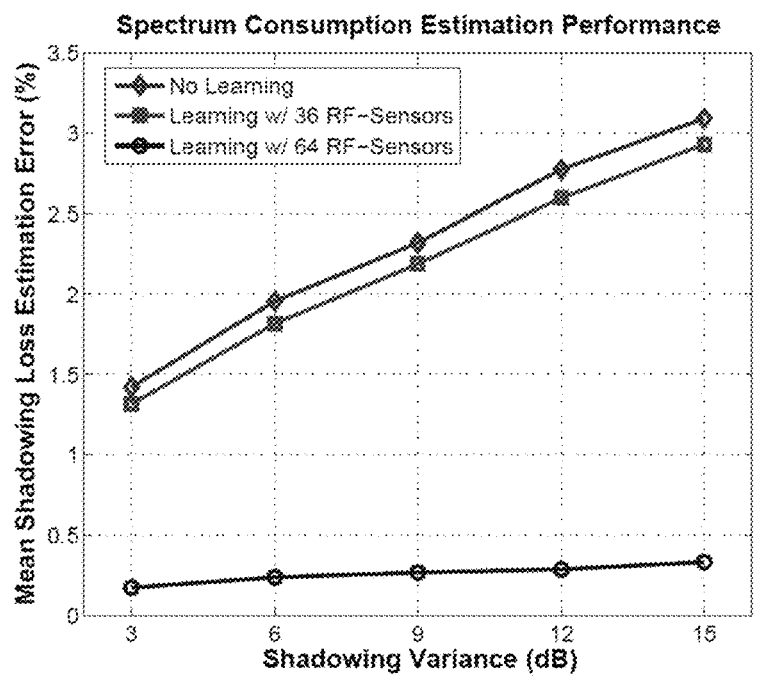
FIGS. 11A-11C illustrate further results of an exemplary embodiment.
Figure 11B:
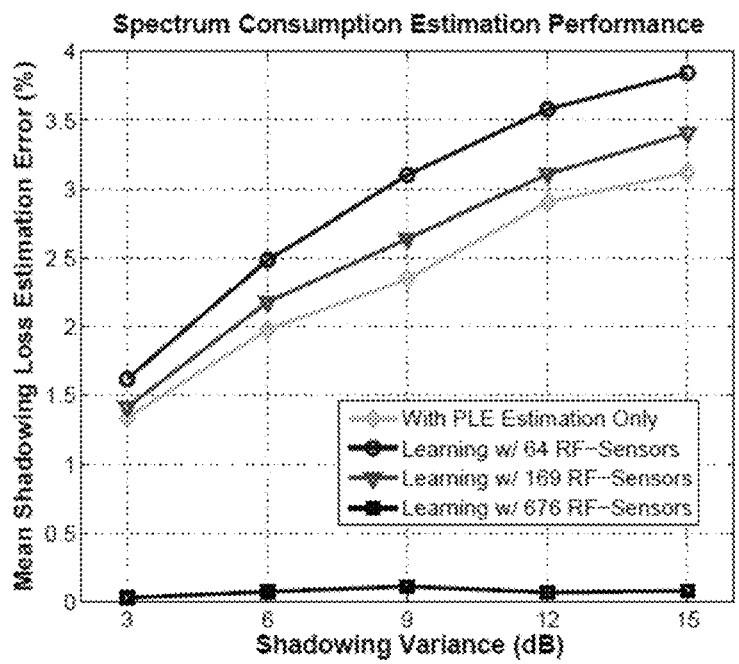
Figure 11C:
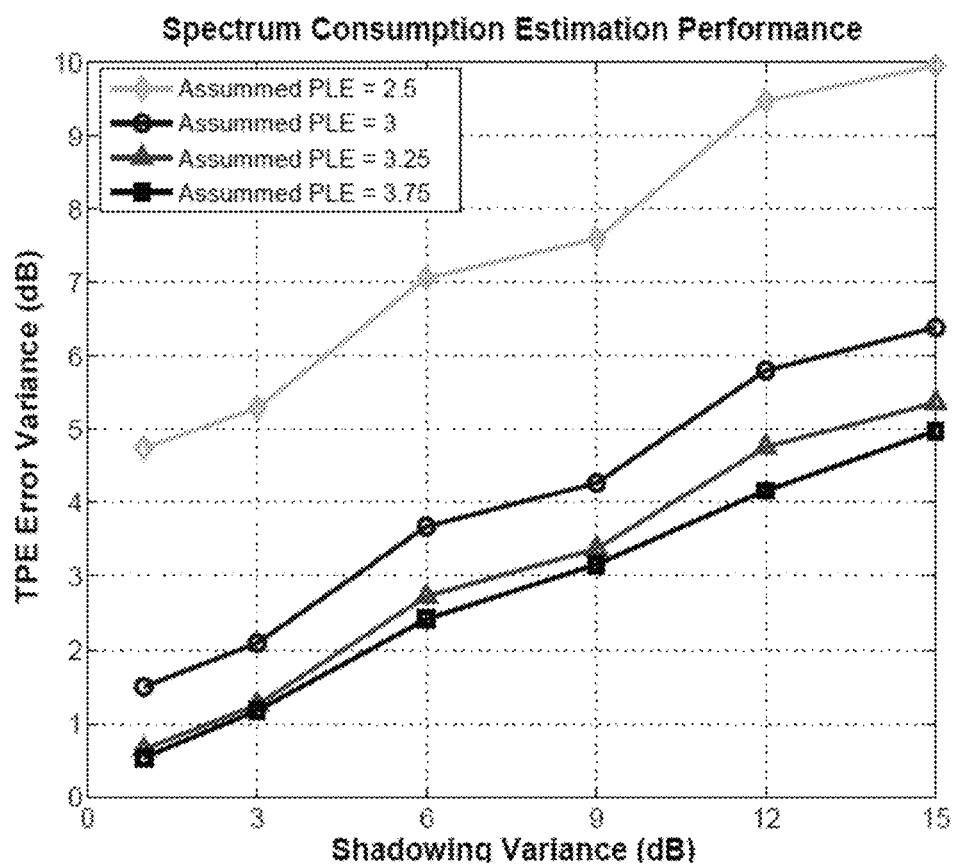

Better results are obtained through characterization of propagation conditions in terms of fine-grained large scale fading effects. This characterization is done using the dedicated RF-sensors. The plot of FIG. 11A shows that shadowing losses across the GR are accurately estimated with 64 RF-sensors wherein shadowing conditions vary at a slower rate (every 500 m). When shadowing conditions change at a faster rate (every 100 m), more RF-sensors are needed. In the plot of FIG. 11B, with 676 RF-sensors, the shadowing losses were accurately estimated across the GR. FIG. 11C illustrates TPE errors with higher values of shadowing variance. This error depends on the chosen value of PLE.

D. Characterizing the Shadowing Profile

Figure 6:
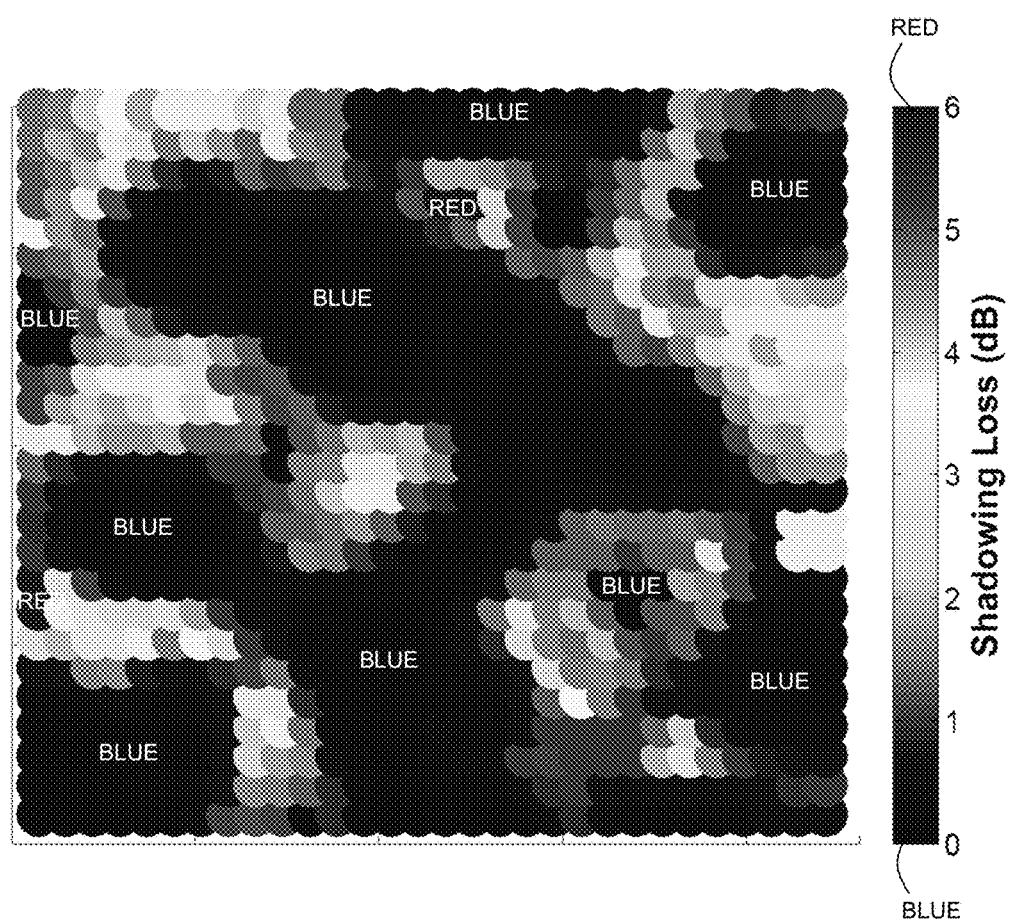
FIG. 6: Fine-grained characterization of shadowing. A dense RF-sensor network is applied for estimating mean path-loss index and shadowing variance within the fine-grained sections of a geographical region. The characterization of fine-grained shadowing loss helps to accurately estimate use of the spectrum in the unit-spectrum spaces.

With a dense RF-sensor network, the shadowing losses in the fine-granular unit-sections of the geographical region are characterized as shown in FIG. 6. The mean PLE and the fine-granular shadowing losses were incorporated while estimating transmit-power for all the transmitters. It is also used in the estimation of spectrum-occupancy and spectrum-opportunity in each of the unit-regions of the geographical region.

Figure 7A:
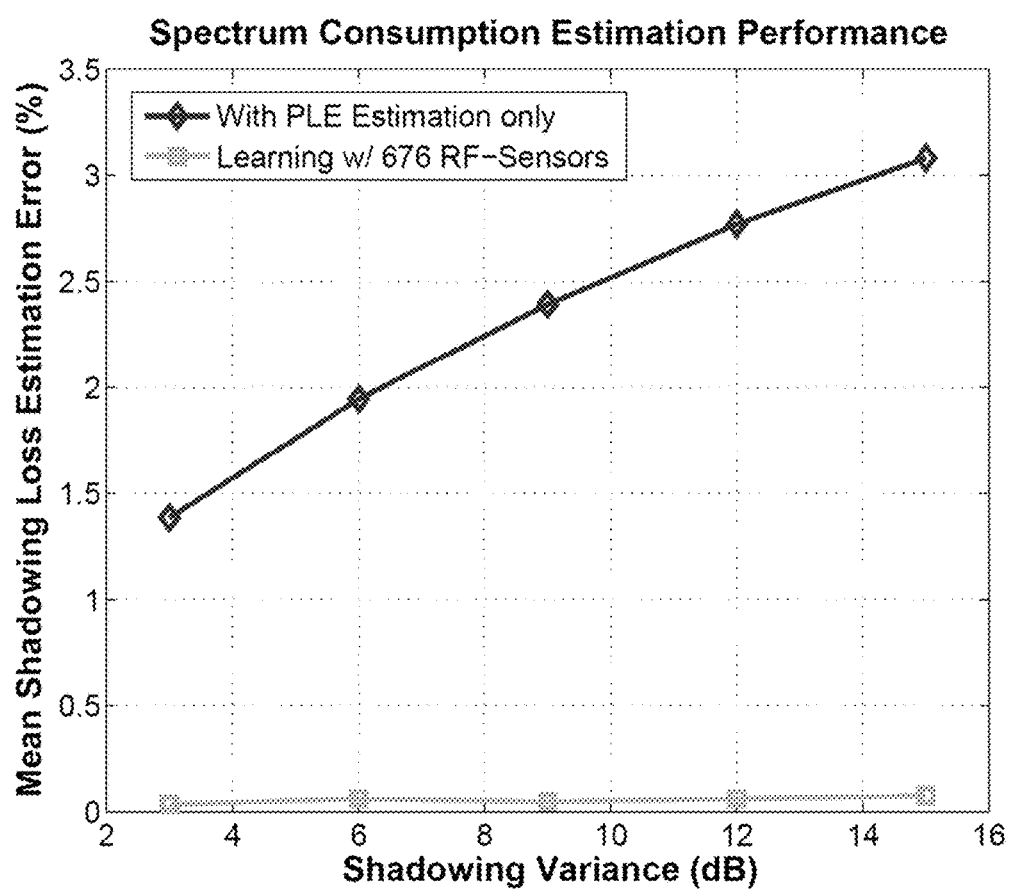
FIGS. 7A-7B: Characterizing the shadowing losses within a geographical region helps to improve the transmit-power estimation performance. Transmit-power is estimated from the received-power using the estimated mean path-loss exponent (PLE) and the shadowing loss.
Figure 7B:
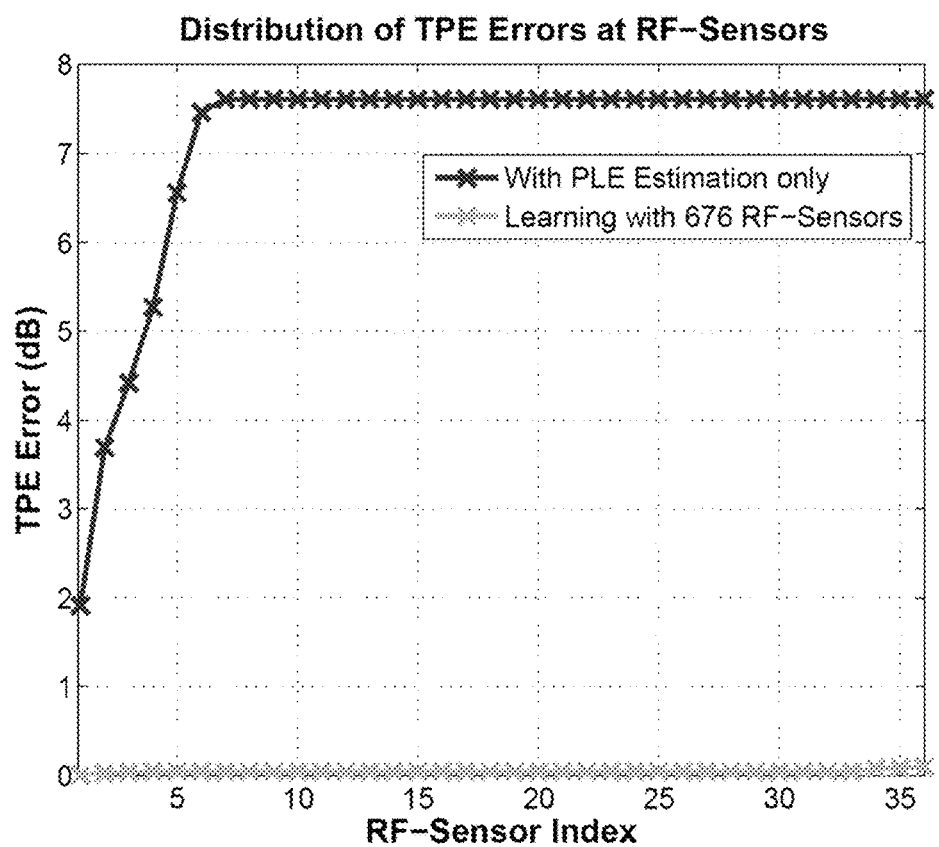

From FIG. 7, significant errors are observed in the transmit-power estimation while not employing characterization of the shadowing profile (refer to legend, 'with PLE estimation only'). With the learning approach (refer to legend, 'Learning with 676 RF-sensors'), the spatial variations in the shadowing loss are estimated with reasonable accuracy and the errors in transmit power estimation are low.

It is acknowledged that the number of RF-sensors required to characterize the propagation environment increase with the complexity of the terrain. In order to reduce the number of RF-sensors, the terrain information from contour maps and satellite maps can be utilized.

Defining and Enforcing a Quantified Spectrum Access Policy

Figure 8:
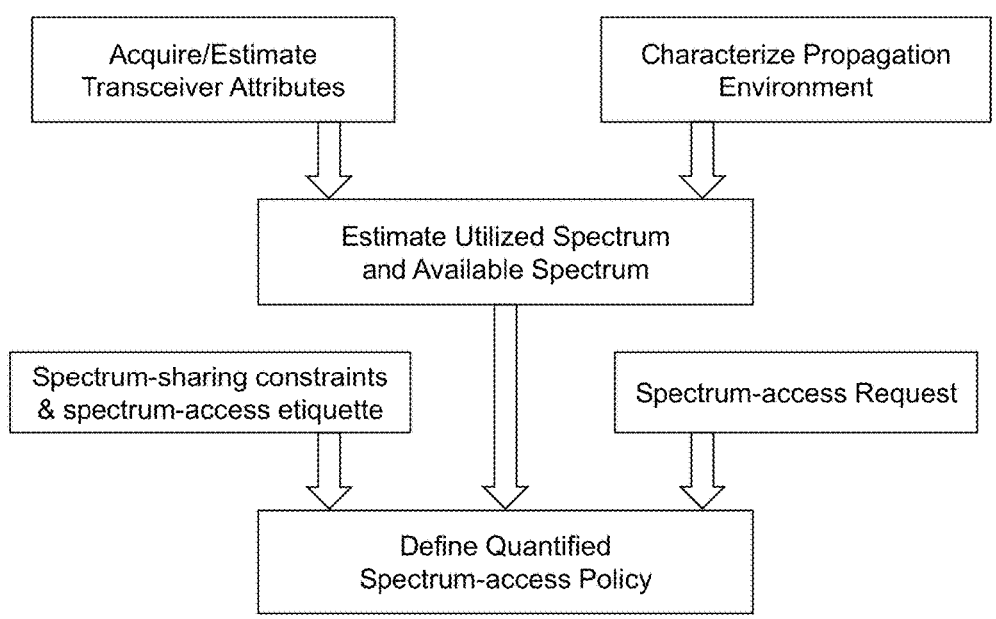
FIG. 8 describes the overall approach for defining spectrum-access rights based on real-time use of the spectrum.

The estimation of the use of spectrum enables the sharing of spectrum with dynamically defined spectrum-access rights. FIG. 8 describes the overall approach for defining a policy with quantified spectrum-access rights in real time. By passively estimating the spectrum-access attributes of the transmitters and by characterizing the propagation environment, the use of spectrum by transmitters and the available spectrum can be estimated. Based on spectrum-sharing constraints and etiquette, quantified spectrum-access rights can be defined and enforced in real time. In some embodiments, a spectrum-sharing model may incorporate a guard-margin to the estimated spectrum-opportunity. A spectrum-access mechanism may further control the spectrum consumed by the to-be-added transceivers and thereby increase the overall number of spectrum accesses. Thus, the spectrum-access rights for the transceivers are defined based on the real-time spectrum-access opportunity, spectrum-sharing constraints, and spectrum-access etiquette. The rights are articulated in terms of allowed use of the spectrum in the space, time, and frequency dimensions and accordingly spectrum-access parameters for the transceivers can be inferred.

In an aspect of the present disclosure, a spectrum manager for defining and enforcing quantified spectrum-access rights in real time is provided. The elements of such a framework include:

Spectrum Sensing Infrastructure (SSI) that learns the fine-grained propagation conditions and estimates the transceiver spectrum-access parameters.

Spectrum-consumption Analysis Infrastructure (SAI) uses the known and estimated transceiver spectrum-access parameters and learned fine-grained propagation model parameters to estimate spectrum-consumption spaces for individual transceivers.

Spectrum-Access Policy Infrastructure (SPI) that manages spectrum-access requests from transceivers. It receives the desired spectrum-access parameters for transceivers of a given spectrum-access request and assigns a spectrum-consumption policy that ensures non-harmful interference with current RF-entities while satisfying the minimum desired spectrum-access attributes. SPI also detects violations of the policy based on information from SAI.

Spectrum-Access Management Infrastructure (SMI) uses the available spectrum-consumption space information in order to schedule and assign spectrum-consumption footprints to the individual transceivers of a spectrum-access request.

Figure 9:
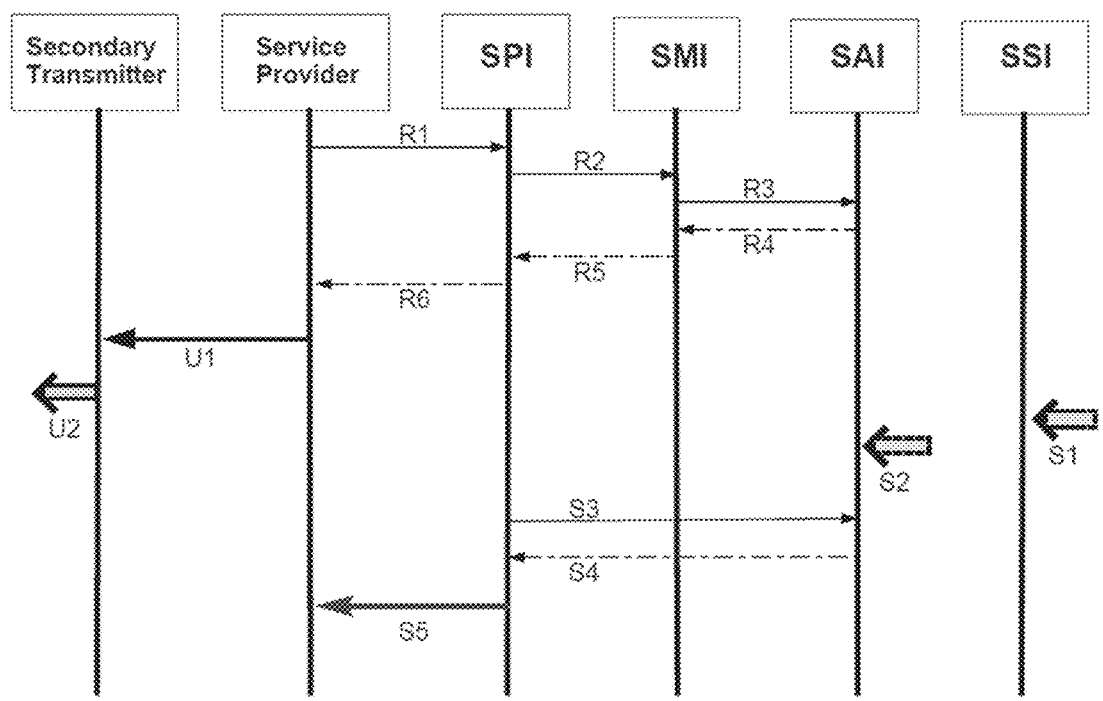
FIG. 9 illustrates a scenario of defining and enforcing a spectrum-access policy.
Figure 10:
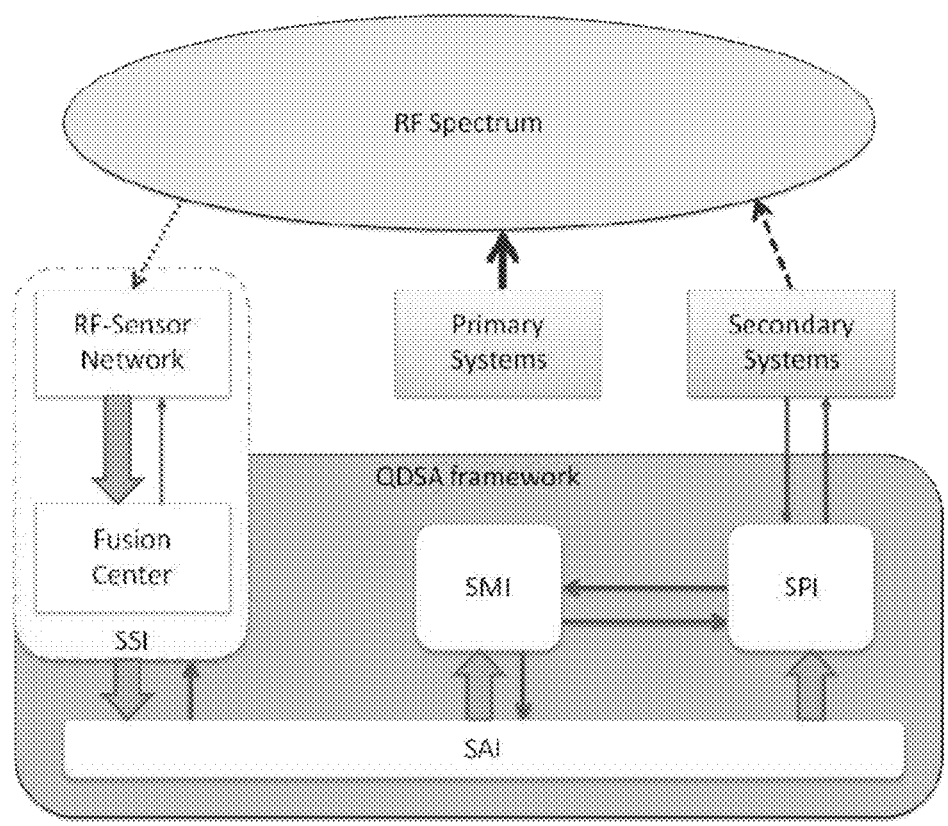
FIG. 10 depicts an exemplary implementation of an embodiment of the present disclosure.

FIG. 9 illustrates a scenario of defining and enforcing a dynamic spectrum-access policy wherein the spectrum management infrastructure estimates the use of spectrum by a transmitter and detects violation of the assigned spectrum-access policy. A service-provider requests a spectrum-access footprint from SPI along with the information about position and capabilities of the transceivers. This is shown with arrows R1-R6. A service-provider assigns a partial time to one of the secondary transmitters (Arrow U1). The secondary transmitter fails to conform to the assigned quantified spectrum-access policy (Arrow U2). This scenario is detected with transmitter spectrum consumption estimation (Arrows S1-S4) and a regulatory action is taken (Arrow S5). FIG. 10 depicts an exemplary implementation of a system according to the present disclosure.

Using the estimation of the spectrum-opportunity across the unit-regions in a geographical region:

the best frequency band can be selected based on the spectrum opportunity at the potential transmitter location across multiple bands.

the transmit power can be defined based on the spectrum opportunity at the transmitter location and make more efficient use of spectrum while ensuring non-harmful interference to all the receivers in the system.

sharing of the spectrum among multiple networks can be controlled. For example, considering spectrum opportunity at an arbitrary point to be −20 dBm, spectrum access can be allowed to a single transmitter such that the RF power from this transmitter at this location is −20 dBm or two or more transmitters (with lower power levels) can be allowed access to the spectrum while ensuring the same constraint.

Thus, estimating the spectrum-opportunity enables efficient allocation and scheduling options for spectrum management.

Towards Maximizing the Use of Spectrum

Now, revisiting the question-map from FIG. 12, in order to maximize the use of spectrum, emphasis is placed on maximizing the spectrum sharing opportunities, maximizing the recovery of the underutilized spectrum and maximizing the exploitation of the recovered spectrum.

Figure 18:
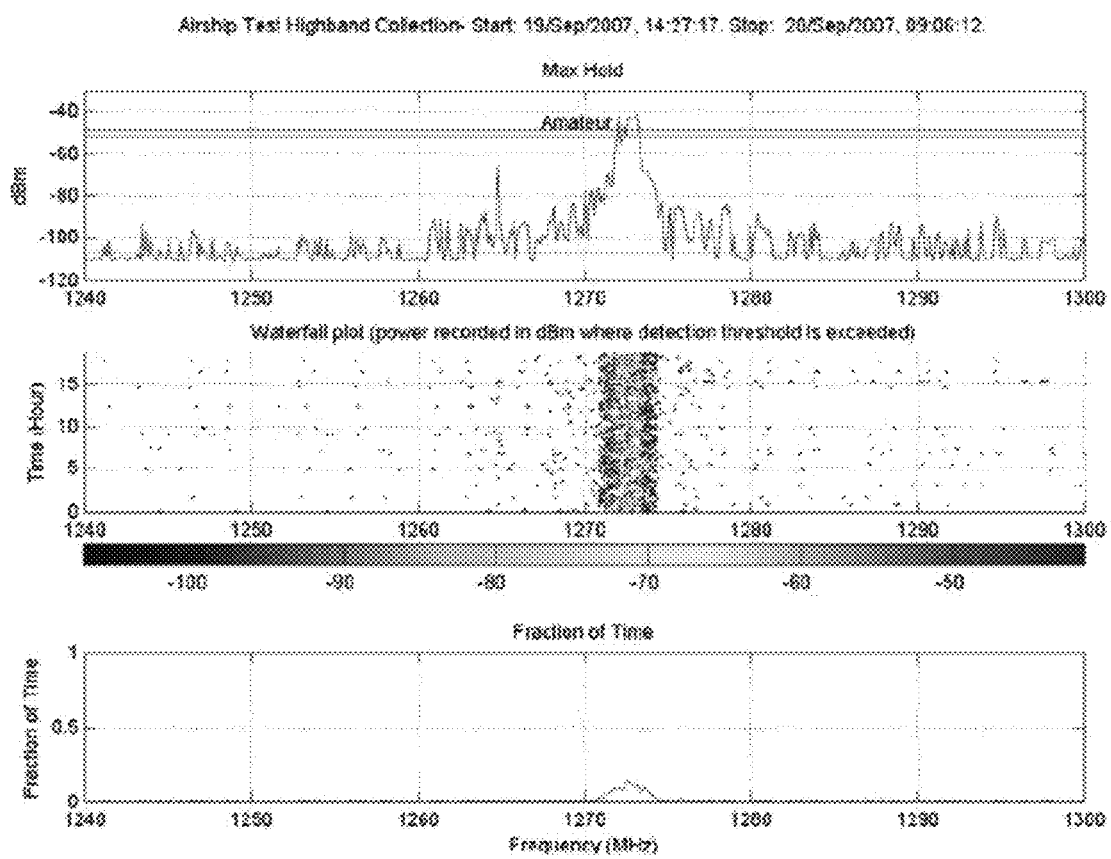
FIG. 18: Spectrum occupancy measurements at Loring Commerce Center from T. Erpek, M. Lofquist, and K. Patton, "Spectrum Occupancy Measurements: Loring commerce centre, Limestone, Me., Sep. 18-20, 2007," Shared Spectrum Company Report, 2007. The measurements illustrate the fast variations in the spectrum occupancy over time.

For maximizing the spectrum sharing opportunities, the spectrum measurements are investigated. The spectrum measurements data shown in FIG. 18 illustrates slower to faster degrees of variations in the occupied RF-power. FIG. 18 captures the fast variations in the occupied RF-power over time. To maximize the use of spectrum, variations in the use of spectrum in the space, time, and frequency dimensions are taken into account. The case-study of OSA has shown that conservative assumptions based on the worst-case conditions severely limit the spectrum available for sharing. Hence, in order to maximize the spectrum available for sharing, we encourage characterizing the use of spectrum in real-time.

Next, once we observe a significant quantity of the underutilized spectrum within a geographical region, we seek to reuse of the underutilized spectrum using dynamic spectrum sharing paradigm. A spectrum-sharing policy under a spectrum sharing model plays a central role in shaping the spectrum available for sharing. (Here, we distinguish these spectrum-access constraints that imply the spectrum available for sharing from the spectrum-access constraints on an individual RF-entity while exercising a spectrum-access. We call the former one as spectrum-sharing policy and the later one as spectrum-access policy.) The constraints defined in a spectrum-sharing policy may suggest a guard-space in time, frequency, or space dimensions. This implies a certain amount of available spectrum is rendered un-exploitable. Using the worst-case propagation conditions and using the worst-case receiver positions due to the lack of knowledge of the receiver positions have been identified as significant weaknesses of OSA spectrum-sharing policy. Consequently, the minimum sensitivity and the maximum transmit-power constraints imposed on the secondary users tend to be very conservative and the available-spectrum that can be exploited by the secondary users is severely (less than 1%) limited.

The actual spectrum exploited by a transceiver depends on the spectrum-access policy. In order to dynamically define an optimal spectrum-access policy, we need the ability to recover the spectrum implied available by a spectrum-sharing policy. We have illustrate recovery of the underutilized spectrum using a dedicated external RF-sensor network. In contrast to the traditional approach wherein spectrum holes are inferred by employing detection of the transmitter-signal, this approach estimates unit-spectrum-space opportunity across the unit-spectrum-spaces within a geographical region. The RF-sensors characterize the fine-grained propagation environment, estimate the spectrum-access parameters of the transceivers exploiting signal cyclostationarity, and thereby estimate the available spectrum-space.

In order to optimally exploit the recovered spectrum for satisfying the spectrum-accesses from multiple spatially-overlapping heterogeneous wireless networks, we emphasize the need for defining a quantified spectrum-access policy. A quantified spectrum-access policy identifies spectrum-access rights in terms of how much of the spectrum can be consumed by an RF-entity within each of the unit-spectrum-spaces within a geographical region. Thus, when multiple spatially-overlapping RF-entities are sharing the spectrum, non-harmful interference could be ensured to the receivers in the system. We note that using the RF-sensor network, the dynamically defined spectrum-access rights can be enforced in real-time by estimating the spectrum-consumption spaces for the individual transmitters.

Defining quantified spectrum-access rights requires us to develop spectrum assignment schemes that can quantitatively control the spectrum-footprint assigned to each of the transceivers. A quantified approach to spectrum exploitation essentially transforms the spectrum-scheduling and spectrum-allocation problems into a problem of optimizing the spectrum consumption spaces for a set of spectrum-access requests. We have presented maximizing the number of spectrum-access requests based on spectrum-consumption by an RF-entity.

Figure 19:
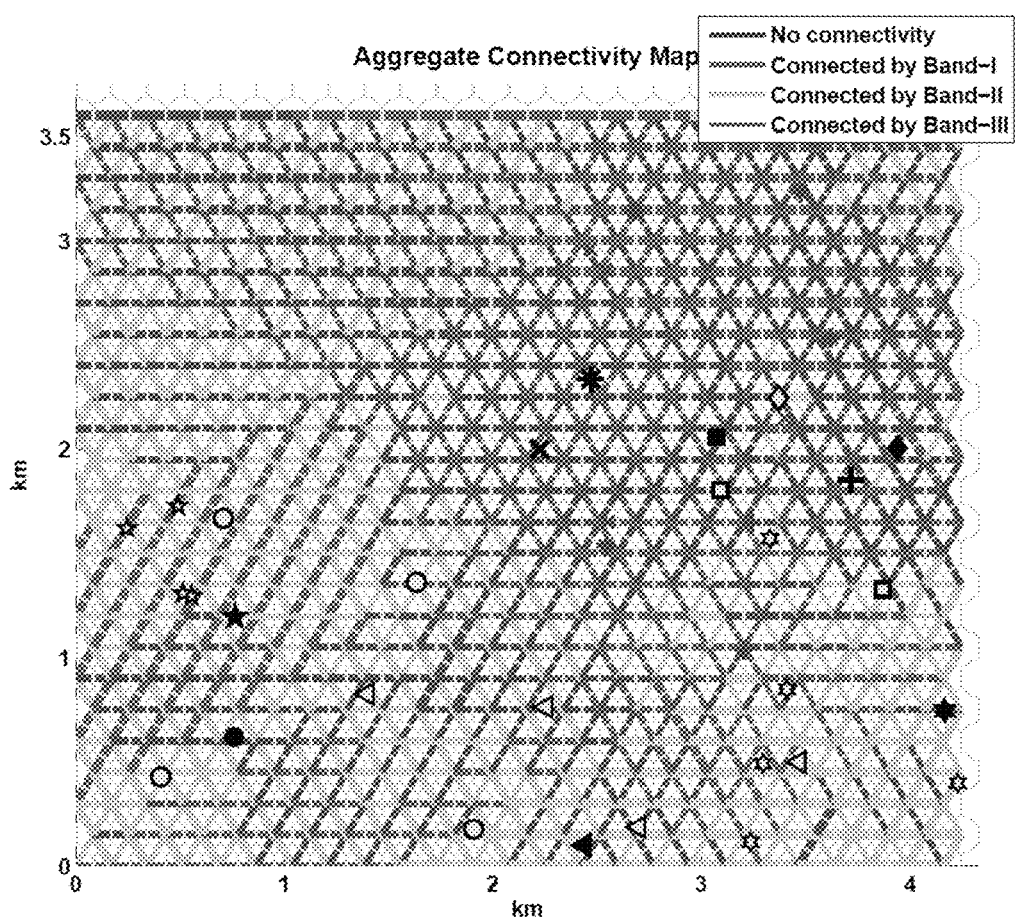
FIG. 19: Multiple-band RF-connectivity map showing the degree to which adjacent unit spectrum-spaces can connect using a new RF-link. Transmitters and receivers in the same network have the same shape; the transmitter is solid. The particular frequency band is encoded through the color of the connecting lines, and the line color is determined by the best available connectivity. The map reveals exploitable spectrum opportunities in the spatial and frequency dimensions. For this particular set of networks, the spectrum opportunities within the band I (green), band II (yellow), and band III (brown) are easily discerned. Moreover, the directional variation in spectrum opportunity is taken into account, so that the best channel to use depends on the spatial orientation of the to-be-added transmitter-receiver pairs.

By characterizing the unit-spectrum-space opportunity in the spatial dimension, we can infer spectral connectivity across the adjacent unit-regions within a geographical region using a certain frequency band. We can also combine the spectrum-access opportunities across multiple frequency bands and infer aggregate RF-connectivity map as shown in FIG. 19. Such fine granular characterization of the use of spectrum can be useful in the optimization of scheduling, spectrum assignment, and routing.

We can further improve the amount of spectrum available for sharing by reducing the spectrum-consumption by RF-entities. Directional transmission and reception helps to improve SINR; reduce the spectrum consumed by transceivers and increase the available-spectrum. Also, with active role by incumbents, primary transmission power could be increased to enhance SINR at the primary receivers, minimize the receiver consumed spectrum, and maximize the spectrum available for sharing with the secondary services.

A key challenge for optimizing spectrum sharing potential is the dynamicity of RF-environment. The propagation conditions may vary quite fast at the order of every few 100 meters. A certain frequency band may not be available at a certain location due to a reappearing primary user. The link quality for secondary access may change due to another mobile secondary user. Here, we note that traditionally wireless network services have been conservatively handcrafted to ensure minimum performance under the worst-case conditions. Dynamic spectrum sharing model forces us to come of the constrained setup and develop dynamic responses to the unknown possibilities in terms of the RF environmental and access conditions. Such dynamic response is possible only via learning the RF-environment and synthesizing behavior, decisions, and actions in advance.

In this regard, the proposed spectrum-discretization approach enables bringing in learning and adaptation to the spectrum management functions. For example, in order to dynamically define the spectrum access rights, we investigate fine granular characterization of the shadowing profile within a geographical region. Real-time characterization of the shadowing loss within a fine granular region helps to control the guard space at the finer granularity and maximize the spectrum available for sharing under dynamic RF environments. With regard to adaptation of the spectrum-access, the RF-connectivity map from FIG. 19 can be used for provisioning redundancy for RF-links. Thus, analysis of the use of spectrum provides rich information and improves the ability to adapt in case of spectrum mobility events.

Benefits Towards Addressing the Challenges for the Dynamic Spectrum Sharing Paradigm In this section, the benefits of MUSE are enumerated from the technical, operational, regulatory, and business perspectives.

A. Benefits Towards Spectrum Management

MUSE helps to characterize and quantify the use of spectrum at the desired granularity in the space, time, and frequency dimensions. MUSE helps to query how much spectrum is consumed by a single transceiver or any logical collection of the transceivers.

MUSE helps to compare, analyze, and optimize the performance of spectrum management functions. For example, it is possible to quantitatively analyze performance of ability to recover the underutilized spectrum of various spectrum sensing algorithms (like energy-detection, cyclostationary feature detection) or various cooperative spectrum sensing infrastructures based on the recovered spectrum space, lost-available spectrum space, and potentially-incursed spectrum space.

MUSE can help to estimate the available spectrum and the exploited spectrum. Thus, it offers the ability to define the spectrum-access rights based on the real-time RF-environment conditions. Using the real-time RF-environment conditions helps to get rid of conservative assumptions and make an efficient use of the spectrum.

The proposed spectrum-discretization approach facilitates adaptation of the spectrum management functions under dynamic RF environment conditions and dynamic spectrum-access scenarios.

B. Benefits Towards Dynamic Spectrum Access

MUSE enables us to articulate, define, and enforce spectrum-access rights in terms of the use of spectrum by the individual transceivers.

From operations perspective, the guard space could be effectively controlled. The discretized spectrum management approach enables us to easily map a guard margin value to the amount of the inexercisable spectrum. Thus, depending on the user-scenario, spectrum sharing behavior could be changed with visibility into the implied availability of the spectrum.

Another advantage from an operational perspective is controlling the granularity of spectrum sharing. With discretized approach to spectrum management, the dimensions of a unit-spectrum-space imply the granularity of sharing of the spectrum resource.

With characterization of spectrum-access opportunity in the space, time, and frequency, MUSE provides the ability to share spectrum without defining a boundary across spectrum uses.

The discretized spectrum management can be applied independent of the spectrum sharing model. Thus, it can be applied in case of the completely dynamic spectrum sharing model like pure spectrum sharing model or even in case of a conservative spectrum sharing model like static spectrum sharing model.

From a regulatory perspective, MUSE offers the ability to enforce a spectrum-access policy and ensure protection of the spectrum rights of the users. As the spectrum-access rights are identified at the granularity of a single transceiver, the violations by a particular transmitter, or the harmful interference for the individual receivers could be characterized and quantified.

C. Benefits Towards Spectrum Trade

The quantified approach brings in simplicity in spectrum trade. It enables easier understanding and interpretation of the outcomes; thus, it requires less skills of its users.

The quantified approach enables to investigate the amount of the spectrum that can shared and evaluate the potential for a business opportunity.

From a business development perspective, spectrum sharing models devised using a quantified approach enable spatial overlap of multiple RF-systems and avoid spatial fragmentation of coverage. This is important for defining new services exercising shared spectrum-access rights.

Aggregation of fine granular spectrum sharing opportunities gives incentives for spectrum-owners to extract more value out of their underutilized spectrum; a bigger spectrum-pool is attractive for secondary users as well. Thus, characterization of the fine granular spectrum-access opportunities enables building a bigger spectrum-resource pool.

Thus, MUSE provides a unified foundation for the spectrum commerce, regulation, operations, and technology.

Finally, a note on the real-time dynamic spectrum access. We encourage defining and enforcing spectrum access rights in real-time. Although this requires a dedicated spectrum management infrastructure, it potentially brings in new business models along with flexible and efficient use of the spectrum and an ability for automated regulation of the dynamic spectrum-accesses.

DISC: Discretized Dynamic Spectrum Management

For the past several decades spectrum management has been centered on handcrafting allocation of the spectrum and imposing spatio-temporal boundaries to ensure minimum performance under the worst-case conditions. Dynamic spectrum sharing requires us to come out from the constrained setup. The spectrum management functions need the ability to define and enforce spectrum access rights in real-time under unknown RF-environment conditions. In this regard, the need for characterizing the spectrum management functions in terms of the use of spectrum by the individual transceivers in the time, space, and frequency dimensions. We define a discretized approach to spectrum management under the new dynamic spectrum sharing paradigm. We illustrate how the spectrum-space discretization approach brings in efficiency in spectrum management functions and helps to address several technical, regulatory, and business difficulties.

Background
Addressing the RF-Environment Dynamicity

The spectrum management under the new paradigm should rely on the worst-case characterization of the RF-environment similar to the static spectrum allocation paradigm but needs the ability of defining and enforcing a spectrum-access policy based on the real-time RF-environment conditions. The spectrum management functions should learn the RF-environment and accordingly synthesize behavior, decisions, and actions. In this regard, an approach to characterize the dynamicity of the RF-environment in real-time and accordingly adapt the use of the spectrum is provided.

Guard Spectrum

With regard to spectrum management, the available-spectrum defined by unit-spectrum-space opportunity across the unit-spectrum-spaces in the geographical region is distinguished from the implied available-spectrum defined by the constraints on spectrum-access under a spectrum sharing model.

Let $\gamma_Z(\chi, \tau, \nu)$ be the constraint on the unit-spectrum-space opportunity imposed by an arbitrary spectrum sharing model Z in a unit-spectrum-space defined by unit-region $\chi$, time-quanta $\tau$, frequency-band $\nu$. Then, the unit-spectrum-space guard-margin imposed by Z is given by $$\delta_Z(\chi,\tau,\nu)=\gamma(\chi,\tau,\nu)+\gamma_Z(\chi,\tau,\nu). \quad (23)$$

Guard-spectrum is defined as the spectrum implied not exercisable within a geographical region by a spectrum sharing model Z. Guard-spectrum is obtained by summing the unit-spectrum-space guard-margin across all the unit-spectrum-spaces. Therefore, $$\Delta_Z = \sum_{k=1}^{\hat{B}} \sum_{j=1}^{\hat{T}} \sum_{i=1}^{\hat{A}} \delta_Z(X_i, \tau_j, \nu_k). \quad (24)$$

The Impact of the Spectrum sharing constraints: The implied available-spectrum can get severely limited by the spectrum-sharing constraints. Due to the lack of knowledge of the receiver positions and the worst-case assumptions about the propagation conditions, in case of Opportunistic Spectrum Access (OSA), the minimum sensitivity and the maximum transmit-power constraints imposed on the secondary users tend to be very conservative and less than 1% of the available-spectrum can be exercised by the secondary users.

Spectrum Recovery Under Spectrum-Overlay Model

In case of the spectrum-overlay model, the pool available for exploitation is further influenced by the algorithms and architecture used for identifying the underutilized spectrum. For example, considering spectrum recovery based on the detection of the primary transmitter signal, false positives in the transmitter detection result into lower performance of spectrum recovery; while missed detections result into potential harmful interference.

In this regards, we can characterize the performance of spectrum recovery in terms of its ability to estimate the unit-spectrum-space opportunity across the unit-spectrum-spaces within a geographical region. Thus, we can characterize the performance of spectrum recovery in terms of the recovered spectrum-space, lost-available spectrum-space, and potentially incursed spectrum-space.

Exploiting the Recovered Spectrum

The exploitable spectrum could be directly accessed or need to be explicitly assigned by a spectrum access mechanism (SAM) controlling access to the spectrum-pool. In order to distinguish from the spectrum sharing constraints, we refer to the spectrum-access constraints defined by the SAM on the individual transceivers of a spectrum-access request as spectrum-consumption policy.

The performance of spectrum exploitation is determined by scheduling and assignment of the spectrum-access parameters to the individual spectrum-access requests. We can characterize the performance of spectrum exploitation in terms of exploited spectrum which represents the spectrum assigned to transmitters and receivers.

incursed spectrum which represents the erroneously exercised spectrum that causes harmful interference at some of the receivers in the system.

unexploited spectrum which represents the spectrum which has not been exploited by the transceivers.

Enforcing Spectrum Access Rights

The discretized spectrum management approach enables enforcing spectrum-access rights defined by the spectrum-consumption policy. By estimating the unit-spectrum-space occupancy across the unit-spectrum-spaces within a geographical region, spectrum-access by the transmitters could be validated and non-harmful interference could be ensured to the protected receivers in the system.

Spectrum Access Adaptation

It is also possible to infer spectrum-connectivity between the adjacent unit-regions within a geographical regions. Here, by combining unit-spectrum-space opportunities across multiple frequency-bands, redundancy could be facilitated in case of spectrum mobility events. The spectrum-connectivity information is also useful in terms of analysis of the traffic characteristics or scheduling and routing of spectrum-access requests in case of the ad-hoc wireless networks. FIG. 19 captures spectrum-connectivity along with the link-quality between the adjacent unit-regions.

RF Environment Characterization

The key challenge for optimizing spectrum sharing potential is the dynamicity of RF-environment. The propagation conditions may vary quite fast at the order of every few 100 meters. A certain frequency band may not be available at a certain location due to a reappearing primary user. The link quality for secondary access may change due to another mobile secondary user. Resorting to the worst-case conditions severely constrains the available spectrum as shown in the case study of the white space availability in UHF TV bands.

Spectrum-space discretization enables us to characterize the propagation environment and spectrum-access conditions at a finer granularity. For example, the variations in the shadowing environment within a geographical regions can be captured at a fine granularity and could be applied for accurately inferring the spectrum-use attributes. Also, we note that the population density varies within the different sections of a geographical region. This information could be useful in the prediction of traffic characteristics.

Towards Cognitive Spectrum Management

Depending on the depth of the RF-environment knowledge, three levels of dynamicity can be viewed in terms of sharing of the spectrum.

a spectrum sharing policy that enables dynamically enables access to the spectrum with fixed constraints on the spectrum-access parameters. An example of this level of dynamicity is access to the white spaces within the UHF bands wherein sensitivity and maximum transmit-power constraints on the secondary user are fixed.

- a spectrum sharing policy that enables dynamically enables access to the spectrum with dynamically defined constraints on the spectrum-access parameters but with fixed guard margins. For example, using the discretized spectrum management approach, more precise spectrum-access parameters could be inferred using the spatial distribution of the unit-spectrum-space opportunity. Here, one may choose to apply certain guard margin with respect to the unit-spectrum-space opportunity in order to handle the lack of knowledge of the propagation environment.
- a spectrum sharing policy that enables dynamically enables access to the spectrum with dynamically defined constraints on the spectrum-access parameters along with dynamically chosen guard margins. In this case, with the real-time characterization of the propagation environment, the applied guard-margin could be less conservative. This can provide more efficient use of the spectrum while ensuring protection of the spectrum-access rights.

Figure 20:
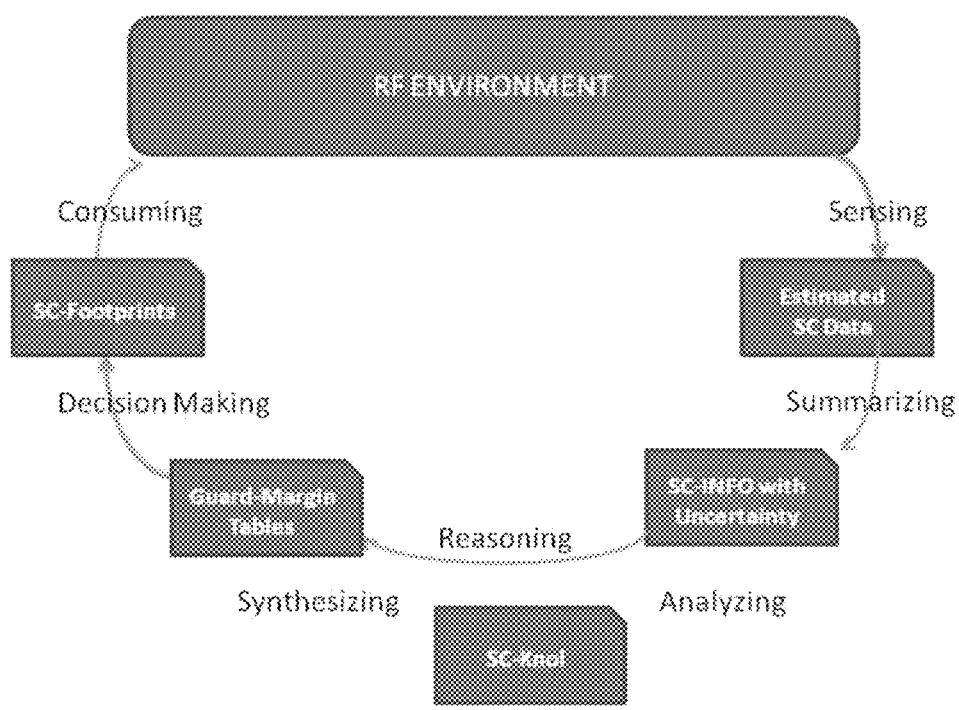
FIG. 20: Cognitive Spectrum Management. The figure shows an approach to build cognition in spectrum management under dynamic spectrum sharing. RF-sensors acquire the Spectrum Consumption data (SC Data) acquired by sensing the spectrum environment. The Spectrum Consumption Information obtained by summarizing the SC-Data is applied for synthesizing various tables that drive the adaptation. The Knowledge gained by analysis and deep learning can be used for predicting certain conditions and synthesizing spectrum management behaviors.

FIG. 20 shows an approach to build cognition in the spectrum management exploiting characterization of spectrum consumption and RF-environment in the discrete unit-spectrum-spaces. By sensing the RF environment, the RF-sensors estimate the fine granular propagation environment parameters and the spectrum-access parameters of the transceivers. This spectrum consumption data (SC-data) is used to gain information about spectrum consumption (SC-Info) in terms of spectrum consumption spaces and spectrum management spaces. This information could be applied to reason fine-granular guard-margin tables in the time, space, and frequency dimensions. By analyzing the spectrum consumption information over several samples in the time, space, and frequency dimensions and applying deep learning techniques, we can acquire more detailed knowledge about the dynamicity of spectrum-access and propagation conditions. The spectrum consumption knowledge may be applied to predict certain conditions for example traffic characteristics, user mobility, a burst in the demand for spectrum within a certain region in order to devise appropriate spectrum management behaviors. This information can be used in the decision making for example while assigning spectrum consumption footprints, redundancy could be ensured.

Benefits

Addressing the Difficulties in the Adoption of Dynamic Spectrum Sharing Paradigm With the discretized approach to spectrum management, we can capture the use of the spectrum and RF-environment characteristics in the time, space, and frequency dimensions and thereby precisely control the use of the spectrum-space. This helps us address several problems towards adopting the new dynamic spectrum sharing paradigm.

- It offers the ability to define spectrum-access rights based on the real-time RF-environment conditions. Using the real-time RF-environment conditions helps to get rid of conservative assumptions and make an efficient use of the spectrum.
- From operations perspective, the guard space could be effectively controlled. The discretized spectrum management approach enables us to easily map the guard margin to the amount of the guard spectrum. Thus, depending on the user-scenario, spectrum sharing behavior could be changed with visibility into implied availability of the spectrum.
- Another advantage from an operational perspective is controlling the granularity of spectrum sharing. Under discretized spectrum management, the dimensions of unit-spectrum-space imply the granularity of sharing of the spectrum resource.
- Furthermore, as the spectrum space discretization enables to aggregate the management of the across multiple frequency bands. Thus, spectrum managers can apply the same spectrum management infrastructure and accomplish fine granular spectrum aggregation. This helps to capture fine granular spectrum-access opportunities across multiple frequency bands enhancing the available spectrum-pool.
- The discretized spectrum management can be applied independent of the spectrum sharing model. Thus, it can be applied in case of the aggressive spectrum sharing model like pure spectrum sharing model or even in case of a conservative spectrum sharing model like static spectrum sharing model.
- From a regulatory perspective, it offers to enforce a spectrum-access policy and ensure protection of the spectrum rights to the users. As spectrum-access rights are identified at the granularity of a single transceiver, the violations by a particular transmitter, or the harmful interference for the individual receivers could be characterized.
- From a commerce perspective, discretized spectrum management brings in simplicity, precision, and efficiency. Spectrum space discretization makes it possible to quantify the resource and facilitates easier interpretation for spectrum sharing. For example, the spectrum trade conversation could be on the following lines: "I have 'x' units of spectrum right now, I have given 'y' units of spectrum to somebody and have 'z' units of spare spectrum which I would like to share". From a commerce perspective, it is simple, easy to interpret, and requires less skills of its user.

SUCCESS: Spectrum Usage Characterization, Computation, and Estimation System

Description of the Technical Concept

SUCCESS is a system for characterizing, computing, and estimation the spectrum usage.

Unlike the traditional approach for determining the spectrum usage which considers only the use of spectrum by transmitters, SUCCESS articulates the use of spectrum by individual transmitters and receivers in the space, time, and frequency dimensions.

SUCCESS characterizes, computes, and estimates the use of spectrum using MUSE methodology. SUCCESS can be used for various spectrum management operations such as analysis and optimization of the use of spectrum, dynamic spectrum sharing, real-time spectrum management, spectrum awareness.

Description of the Technology

SUCCESS analyses electromagnetic environment data and characterizes, quantifies, and estimates the use of spectrum. The data includes RF transceivers parameters and propagation environment parameters. The data can be fed manually or through online (real time)-offline databases.

SUCCESS applies MUSE methodology to characterize, quantify, and estimate the use of spectrum. Additionally, it performs detailed analysis that provide essential information for spectrum management, spectrum sharing, and spectrum regulation. The question-map of FIG. 1 enumerates questions that get addressed with SUCCESS.

FIGS. 3-4 show sample information generated by SUCCESS. FIG. 3 shows an example occupancy map (spatial distribution of the use of spectrum by a transmitter), and FIG. 4 shows an example opportunity map (spatial distribution of the spectrum available for use). The system could be designed to be stationary or mobile or a combination of the two.

SUCCESS has numerous benefits, including:
1. SUCCESS provides characterization, quantification, and estimation of use of spectrum by individual transceivers or any logical collection of transceivers (for example, RF-system). This capability is useful for spectrum management, spectrum sharing, quantified dynamic spectrum access, spectrum regulation, and spectrum trade.
2. SUCCESS is independent of spectrum sharing models, algorithms, or environments. SUCCESS enables analysis and optimization of spectrum management functions. One can compare performance of spectrum allocation algorithms, spectrum sharing models, or spectrum sharing systems. Table III illustrates some of criteria that could be used in such analysis, comparison, and optimization.
3. SUCCESS captures fine granular variations in the use of spectrum in the space, time, and frequency dimensions. SUCCESS therefore is highly useful for quantified fine-grained spectrum operations, sharing, management, regulations, and trade.
4. SUCCESS provides precise information about spectrum in easy to interpret manner. SUCCESS thus enables simplicity, precision, and efficiency in spectrum operations.
5. SUCCESS enables defining and enforcing the use of spectrum in quantified manner. This capability is essential for quantified (static or dynamic) use of spectrum by multiple heterogeneous spatially overlapping RF systems.

QDSA: A Quantified Descrete Spectrum Access Framework

Dynamic spectrum sharing is essential for meeting the growing demand for RF spectrum. The key requirement for dynamic spectrum access system is ensuring coexistence of multiple heterogeneous RF systems sharing spectrum in time, space, and frequency dimensions. There are several technical, business, and regulatory challenges around defining and enforcing a dynamic policy that can provide simple, flexible, and efficient spectrum sharing and enable protection of spectrum rights. In this paper, we propose a framework for dynamic spectrum sharing paradigm that articulates spectrum rights in terms of quantified spectrum usage footprints at the lowest granularity of spectrum access. The proposed framework essentially enables treating RF-spectrum as a commodity that can be shared, traded in simple, flexible, and efficient manner.

Transmitters consume RF-spectrum by in terms of RF-power in space, time, and frequency dimensions. Receivers consume RF-spectrum in terms of constraining the RF-power in space, time, and frequency dimensions. The framework is based on discretized spectrum space model wherein spectrum usage by the transceivers is quantified at a sample point in the unit spectrum spaces. Thus, using the present discrete spectrum consumption quantification (DSCQ) methodology, the spectrum assigned or utilized by a transmitter or receiver can be quantified. The discretization and quantification approach transforms spectrum into a commodity that can be exchanged with service providers, a policy that can be regulated, and a resource that can be precisely controlled for making an efficient use.

Within the QDSA framework, an entity that wishes to request spectrum access communicates with a Spectrum-access Policy Infrastructure (SPI). Here, the entity requesting spectrum access could be, for example, an individual transceiver, a wireless service provider, or a spectrum broker. The spectrum access request provides information about the transceiver positions, transceiver performance attributes, capabilities, and desired spectrum-access attributes (e.g. duration of spectrum access, SINR at the receiver).

The SPI communicates with Spectrum Analysis Infrastructure (SAI) in order to define spectrum-access footprints for the individual transceivers. SAI receives real time information regarding spectrum consumption from Spectrum Sensing Infrastructure (SSI). The SSI employs an external dense RF-sensor network and estimates usage of spectrum by individual transceivers in real time using advanced signal processing and learning algorithms.

SAI evaluates feasibility of coexistence and allocates quantified spectrum-access footprints to the individual transceivers of the spectrum-access request. SPI maps the spectrum-access footprints into an enforceable spectrum-access policy and spectrum-access is granted to the requesting entity.

By estimating utilized and available spectrum space in real time, SSI provides the ability to define and regulate a dynamic spectrum-access policy. When the spectrum usage footprint estimated by SSI violates the assigned spectrum usage footprint, SPI can void the spectrum-access policy and can take regulatory action.

Following are the key contributions of QDSA:
- The quantified approach of QDSA enables easier understanding and interpretation of the outcomes. With spectrum as quantified resource perspective, the spectrum trade conversation could be on the following lines: "I have x units of spectrum right now, I have given y units of spectrum to somebody and have z units of spare spectrum which I would like to share or may be keep as a reserve".
- QDSA enables spatial overlap of multiple RF-systems while protecting spectrum rights. This has a significant implication in devising spectrum sharing services with a large number of fine-grained spectrum-accesses in a geographical region. In our simulation results, we show that up to 100 small footprint RF-networks coexisting without harmful interference within 4.3 km×3.7 km geographical region within a single frequency band.
- In addition to providing the ability to defining and regulating a quantified spectrum-access policy, discretization of spectrum space facilitates aggregating spectrum access opportunities in space, time, and frequency dimensions for efficient routing and allocation of spectrum. It enables provisioning redundancy to spectrum links in order to meet desired link quality under dynamic conditions. Spectrum aggregation facilitated by the proposed methodology helps building a bigger spectrum pool and thus enables building attractive business models for dynamic spectrum access.

HONEYCOMB: A Real-Time Infrastructure for Spectrum Aggregation and Spectrum Virtualization Description of the Technical Concept HONEYCOMB is a real-time infrastructure for aggregation and virtualization of the spectrum resource. It enables to create a pool of spectrum-resource across the space, time, and frequency dimensions and provisions spectrum-resource in a virtualized manner to multiple RF services.

By aggregating and virtualizing spectrum resource, HONEYCOMB infrastructure facilitates efficient sharing of the spectrum resource.

HONEYCOMB serves as the underlying fabric for communications using a spectrum-resource. HONEYCOMB infrastructure facilitates optimization and adaptation of the spectrum-use in the events of spectrum mobility. It facilitates analysis and control over traffic for commercial and military use cases.

Description of the Technology

HONEYCOMB infrastructure is composed of RF-sensor and RF-relay nodes that define a mesh for serving communications across space, time, and frequency dimensions within a geographical region.

The infrastructure employs technologies, including:
1. Spectrum aggregation;
2. Spectrum virtualization;
3. Quantified use of spectrum based on MUSE and QDSA-paradigm (quantified dynamic spectrum access paradigm; and
4. Real-time estimation, analysis, and optimization of the use of spectrum based on DISC (spectrum discretization) and SPHERE technologies. The RF-sensor and RF-relay nodes sense the transmitters, estimate their spectrum-use attributes including location, transmit-power, and directionality employing SPHERE technology.

Figure 21:
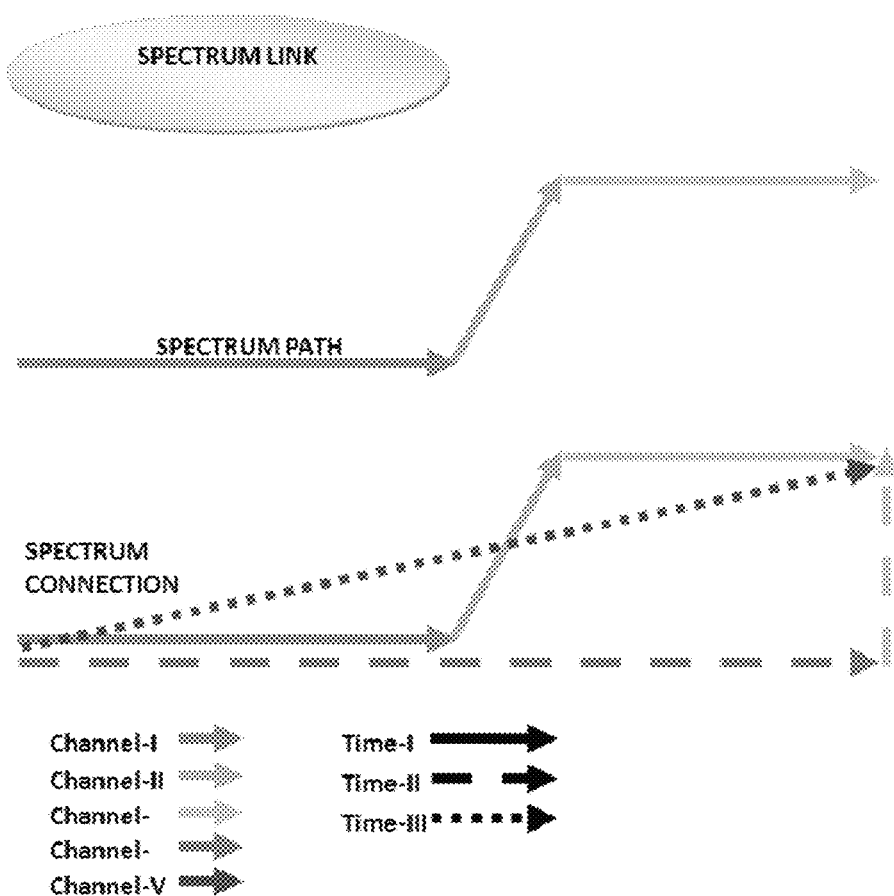
FIG. 21: The primitives of a spectrum-fabric.
Figure 22:
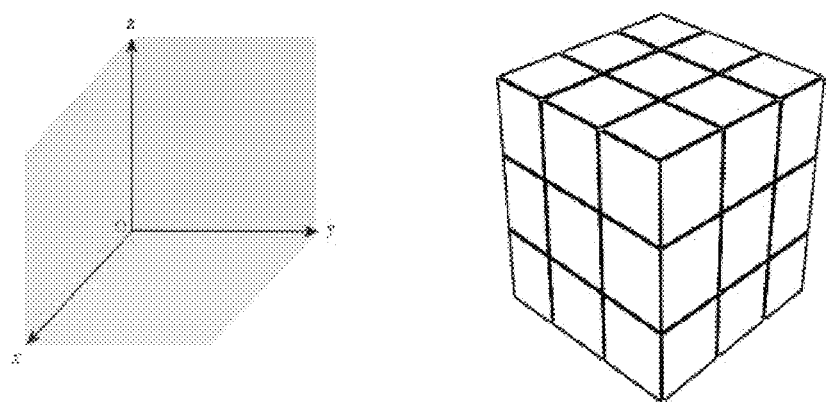
FIG. 22: Illustration of unit-spectrum-spaces.
Figure 23:
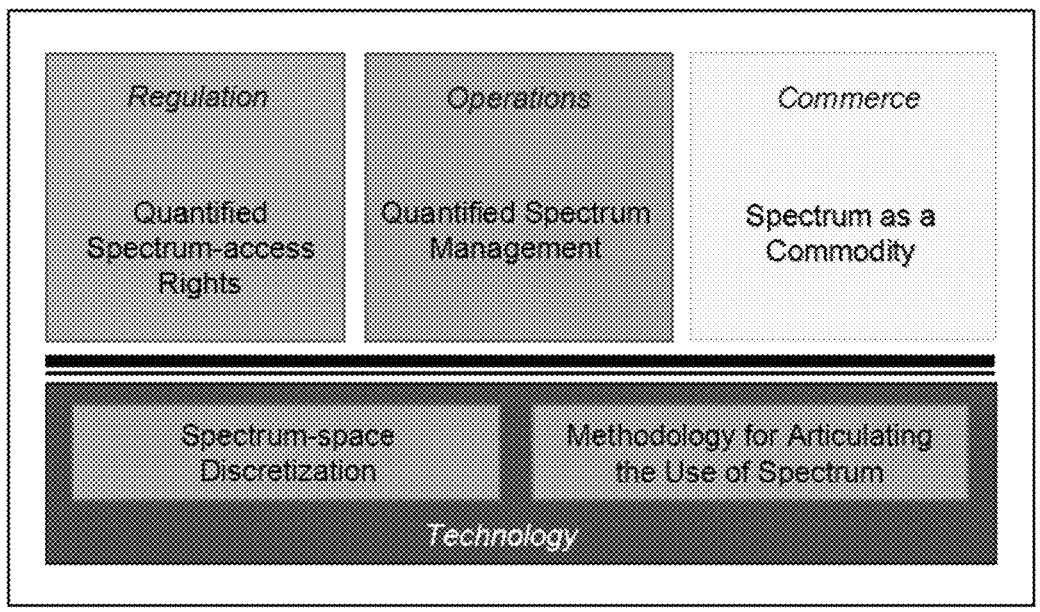
FIG. 23: Chart with overview of Spectrum Technology.

Spectrum-fabric is defined in terms of the primitives shown in FIG. 21.

FIG. 19 shows an example of fabric serving communications within a geographical region. The unit-spectrum-spaces are defined based on the degree of discretization across the space, time, and frequency dimensions. The RF-sensor nodes and RF-relay are deployed based on spectrum dynamicity and spectrum-access density.

HONEYCOMB offers ability to optimal routes within the infrastructure with the aid of relay Nodes. These optimal routes act like freeways. This avoids contention and provide more efficient scheduling, routing, and higher throughputs.

The nodes under the HONEYCOMB infrastructure could be designed to be stationary or mobile or a combination of the two. The RF-sensor and relay nodes could be hierarchically arranged for optimizing the functionality and infrastructure-cost.

Benefits
1. HONEYCOMB enables aggregating underutilized spectrum across the space, time, and frequency dimensions.
2. HONEYCOMB enables efficient use of the spectrum by virtualizing the spectrum-resource.
3. Standard consumer devices cannot afford to include wideband frequency agile radios that are large, heavy, computational intensive, and costly. HONEYCOMB provisions a backhaul that can simplify delivering connectivity while exploiting the dynamic spectrum-access opportunities.
4. HONEYCOMB enables management of spectrum-resource in terms of spectrum-connections. It offers provisioning, monitoring, adaptation, and optimization of spectrum-connections.
5. HONEYCOMB offers the ability to estimate, analyze, optimize, manage the use of spectrum at the finest granularity of spectrum-access and helps to increase business potential.
6. Under military use-cases, HONEYCOMB provides ability for surveillance, situational awareness, spectrum-use analysis, command-and-control, and electronic warfare.

COCOA: Command and Control Over the Electromagnetic Environment

Description of the Technical Concept

COCOA is an architecture for seeking command and control over the electromagnetic environment (EME).

Under military use-cases, COCOA architecture enables situational awareness, surveillance, control, and electronic warfare. Under commercial use-cases, COCOA facilitates provisioning, monitoring, adaptation, and optimization of spectrum-connections.

COCOA enables communication under the military and commercial operational constraints. To accomplish this, the COCOA architecture manifests the spectrum-resource as a fabric of the spectrum-connections.

COCOA facilitates spectrum sharing by enabling the management of spectrum in terms of spectrum-connections, but COCOA is not purposed for spectrum sharing. It seeks command and control of all the (military/commercial) communications over electromagnetic environment.

Description of the Technology

COCOA manages the spectrum-resource as a fabric of spectrum-connections. In this regard, it defines the primitives shown in FIG. 21.

COCOA uses an infrastructure with Sensor/Relay nodes (SR-nodes).

COCOA-based systems perform spectrum infrastructure analysis functionality. The SR-nodes sense the transmitters, estimate their spectrum-use attributes including location, transmit-power, and directionality. To enable advanced situational awareness, the system uses the acquired data to build higher level information and derives knowledge from the information.

The spectrum-access is through the SR-nodes. The SR-nodes have the capability of blocking the non-conforming spectrum-accesses. The SR-nodes are able to observe the use of spectrum-space, observe the traffic, and optionally control the traffic.

The system could be designed to be stationary or mobile or a combination of the two.

Benefits
1. COCOA manifests spectrum-resource as a fabric of spectrum-connections. Thus, it offers command and control over all the communications using the spectrum-resource.
2. COCOA provides management of spectrum connections. It offers provisioning, monitoring, adaptation, and optimization of spectrum-connections.
3. Under military use-cases, COCOA offers the ability to survey, inspect, block communications useful for electronic warfare.

COIN: A New Model for Spectrum Commerce

COIN is a new model for spectrum commerce that brings in simplicity, precision, and efficiency in the spectrum trade.

Spectrum sharing involves various technical, operational, and regulatory challenges. These challenges in turn pose as impediments for businesses and commerce. COIN commodifies the spectrum-resource and addresses the business and commerce challenges. COIN makes it feasible to share spectrum in simple, precise and efficient manner: For example: "I have 'x' units of spectrum right now, I have given 'y' units of spectrum to somebody and have 'z' units of spare spectrum which I would like to share."

The COIN business model manifests spectrum as a commodity on the basis of MUSE and DISC concepts.

In order to treat an item as a commodity:
1. It is advantageous to be able to precisely measure the use of the item
2. It is advantageous to precisely provide desired amount of quantity of the item to its user 3. It is advantageous that the item is shows certain degree of fungibility (indistinguishable source for the identical item characteristics and ability to exchange the item with similar item).

These properties are incorporated into radio frequency spectrum and enable it to be treated as a commodity.
1. Under COIN model, the use of spectrum-commodity is articulated in terms of the amount of spectrum consumed by individual transceivers in the space, time, and frequency dimensions.
2. Under COIN model, the ability to share spectrum-commodity is provided in precise and flexible manner by virtue of MUSE, DISC, and QDSA technologies.
3. Under COIN model, the spectrum-commodity is qualified based on use characteristics (link-throughput, link-reliability, link-redundancy). The spectrum-commodity of the quality attributes can be provisioned to be indistingushable and interchangable.

The COIN business model defines pricing approaches for the spectrum-commodity
1. The spectrum-commodity is charged based on the actual usage quantity.
2. In addition to that, the spectrum-commodity is charged based on the item quality attributes.
3. Finally, the spectrum-commodity is charged based on market driven approaches (For example, demand based pricing, auction based pricing.)

Illustration

Employing DISC technology, the spectrum in a geographical region is divided into multiple discrete unit-spectrum-spaces (see, e.g., FIG. 2). Employing MUSE technology, the use of spectrum within each of the unit-spectrum-spaces is quantified (see FIG. 1). Employing QDSA technology, spectrum-access rights are defined and enforced based on the quantified use of the spectrum by individual transceivers in the space, time, and frequency dimensions (see FIG. 2). This enables quantified sharing of the spectrum-commodity. Employing HONEYCOMB technology, spectrum-commodity can be optionally provisioned in terms of reliable, redundant, and qualified spectrum-connections. (Note that spectrum-commodity can be consumed with or without the HONEYCOMB infrastructure in a quantified and qualified manner.)

Here, per the COIN pricing scheme, the price of the spectrum-connection would depend on the link-throughput, link-reliability, and link-redundancy in addition to the spectrum consumed by the link (see FIG. 19).

Benefits

COIN manifests spectrum as a commodity simplifying spectrum commerce. COIN enables to share spectrum in simple, precise and efficient manner: For example: "I have 'x' units of spectrum right now, I have given 'y' units of spectrum to somebody and have 'z' units of spare spectrum which I would like to share."

COIN serves a business model for spectrum commerce that's handles elastic demand/supply and provisions spectrum-resource to many.
1. The price of this commodity will vary depending on time,
2. location, band, and quality. The commodity could also be purchased with additional privileged spectrum-access attributes. The commodity could
3. also be purchased with options for automatic adaptations depending on user requirements.

COIN eliminates the technical, regulatory, and operational problems. COIN thus isolates business users from complexities traditionally faced by its users.

COIN business model allows fine-grained usage of the spectrum resource. Thus, it brings in precision as well as efficiency in the spectrum trade.

COIN enables to understand the business potential of spectrum-resource.

Although the present disclosure has been described with respect to one or more particular embodiments, it will be understood that other embodiments of the present disclosure may be made without departing from the spirit and scope of the present disclosure. Hence, the present disclosure is deemed limited only by the appended claims and the reasonable interpretation thereof.

What is claimed is:

1. A method for determining whether to grant a request for spectrum access, comprising:
    electronically receiving the request for spectrum access, wherein the request comprises a desired frequency band; a desired time period, a requested transmit power, and a requested transmitter location;
    determining a geographical region based on the requested transmitter location and requested transmit power;
    dividing the geographical region into a set of unit-spectrum-spaces, each unit-spectrum-space comprising a unit-region of space having a sample point, a time quanta, and a frequency band;
    receiving, from an RF sensor network, current spectrum consumption information for transmitters and receivers in the geographical region;
    quantifying utilized-spectrum for the geographical region by:
        calculating the power received from each transmitter in the geographical region at each of a plurality of sample points, wherein each sample point of the plurality of sample points corresponds to a unit-region of the geographical region;
        calculating a spectrum-occupancy for each sample point by aggregating the power received from each transmitter at the respective sample point and the average ambient noise power at the respective sample point;
        calculating a spectrum-occupancy for each unit-spectrum-space within the geographical region; and
        aggregating the spectrum-occupancy of each unit-spectrum-space
    quantifying available-spectrum for the geographical region; and
    granting or denying the request for spectrum access according to the utilized-spectrum and available-spectrum.

2. The method of claim 1, wherein calculating the power received from each transmitter comprises:
    calculating a transmitter-occupancy at each sample point for each transmitter in the geographical region;
    calculating a transmitter-occupancy in each unit-spectrum-space within the geographical region; and
    aggregating the transmitter-occupancy of each unit-spectrum-space.

3. The method of claim 1, wherein quantifying available-spectrum for the geographical region, further comprises:
    calculating the power received from each transmitter in the geographical region at each of a plurality of sample points, wherein each sample point of the plurality of sample points corresponds to a unit-region of the geographical region;
    calculating a spectrum-occupancy for each sample point by aggregating the power received from each transmitter at the respective sample point and the average ambient noise power at the respective sample point;

calculating a spectrum-occupancy for each unit-spectrum-space within the geographical region;

calculating a receiver interference-margin for each receiver in the geographical region at each of a plurality of sample points, wherein each sample point of the plurality of sample points corresponds to a unit-region of the geographical region;

calculating a receiver-imposed interference-opportunity for each receiver in the geographical region at each of the plurality of sample points;

calculating a spectrum-opportunity at each sample point, wherein the spectrum-opportunity is a minimum value of the calculated receiver-imposed interference-opportunity for each receiver at the respective sample point;

calculating a unit-spectrum-space opportunity for each unit-spectrum-space within the geographical region;

calculating a unit-spectrum-space liability by subtracting the unit-spectrum-space occupancy and unit-spectrum-space opportunity from the maximum spectrum-consumption for each unit-spectrum-space within the geographical region; and aggregating the unit-spectrum-space liability of each unit-spectrum-space.

4. The method of claim 3, wherein calculating the power received from each transmitter in the geographical region comprises:

calculating a receiver-liability at each of a plurality of sample points and for each receiver in the geographical region, wherein each sample point of the plurality of sample points corresponds to a unit-region of the geographical region;

calculating a receiver-liability in each unit-spectrum-space within the geographical region; and aggregating the receiver-liability of each unit-spectrum-space.

5. A system for controlling spectrum access, comprising:
a communication port;
a processor in electronic communication with the communication port, the processor programmed to:
receive a request for spectrum access at the communication port, wherein the request comprises a desired frequency band; a desired time period, a requested transmit power, and a requested transmitter location;
determine a geographical region based on the requested transmitter location and requested transmit power;
receive at the communication port, from an RF sensor network, current spectrum consumption information for transmitters and receivers in the geographical region;
quantify utilized-spectrum for the geographical region by:
calculating the power received from each transmitter in the geographical region at each of a plurality of sample points, wherein each sample point of the plurality of sample points corresponds to a unit-region of the geographical region;
calculating a spectrum-occupancy for each sample point by aggregating the power received from each transmitter at the respective sample point and the average ambient noise power at the respective sample point;
calculating a spectrum-occupancy for each unit-spectrum-space within the geographical region; and aggregating the spectrum-occupancy of each unit-spectrum-space;

quantify available-spectrum for the geographical region; and transmit a response granting the request for spectrum access according to the utilized-spectrum and available-spectrum.

6. The system of claim 5, wherein the processor is programmed to calculate the power received from each transmitter by:

dividing the geographical region into a set of unit-spectrum-spaces, each unit-spectrum-space comprising a unit-region of space having a sample point, a time quanta, and a frequency band;

calculating a transmitter-occupancy at each sample point for each transmitter in the geographical region;

calculating a transmitter-occupancy in each unit-spectrum-space within the geographical region; and aggregating the transmitter-occupancy of each unit-spectrum-space.

7. The system of claim 5, wherein the processor is programmed to quantify available-spectrum for the geographical region by:

calculating the power received from each transmitter in the geographical region at each of a plurality of sample points, wherein each sample point of the plurality of sample points corresponds to a unit-region of the geographical region;

calculating a spectrum-occupancy for each sample point by aggregating the power received from each transmitter at the respective sample point and the average ambient noise power at the respective sample point;

calculating a spectrum-occupancy for each unit-spectrum-space within the geographical region;

calculating a receiver interference-margin for each receiver in the geographical region at each of a plurality of sample points, wherein each sample point of the plurality of sample points corresponds to a unit-region of the geographical region;

calculating a receiver-imposed interference-opportunity for each receiver in the geographical region at each of the plurality of sample points;

calculating a spectrum-opportunity at each sample point, wherein the spectrum-opportunity is a minimum value of the calculated receiver-imposed interference-opportunity for each receiver at the respective sample point;

calculating a unit-spectrum-space opportunity for each unit-spectrum-space within the geographical region;

calculating a unit-spectrum-space liability by subtracting the unit-spectrum-space occupancy and unit-spectrum-space opportunity from the maximum spectrum-consumption for each unit-spectrum-space within the geographical region; and aggregating the unit-spectrum-space liability of each unit-spectrum-space.

8. The system of claim 7, wherein the processor is programmed to calculate the power received from each transmitter in the geographical region by:

calculating a receiver-liability at each of a plurality of sample points and for each receiver in the geographical region, wherein each sample point of the plurality of sample points corresponds to a unit-region of the geographical region;

calculating a receiver-liability in each unit-spectrum-space within the geographical region; and aggregating the receiver-liability of each unit-spectrum-space.

\* \* \* \* \*